(12) United States Patent
Lee et al.

(10) Patent No.: US 10,061,358 B2
(45) Date of Patent: Aug. 28, 2018

(54) MOBILE TERMINAL

(71) Applicant: LG ELECTRONICS INC., Seoul (KR)

(72) Inventors: Haklim Lee, Seoul (KR); Jongbeom Han, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

(21) Appl. No.: 15/473,509

(22) Filed: Mar. 29, 2017

(65) Prior Publication Data

US 2017/0364119 A1    Dec. 21, 2017

(30) Foreign Application Priority Data

Jun. 15, 2016  (KR) .................. 10-2016-0074462

(51) Int. Cl.
| | | |
|---|---|---|
| H05K 7/00 | (2006.01) | |
| H05K 5/00 | (2006.01) | |
| G06F 1/16 | (2006.01) | |
| G09G 5/00 | (2006.01) | |
| H04M 1/02 | (2006.01) | |

(52) U.S. Cl.
CPC .......... *G06F 1/1652* (2013.01); *G06F 1/1624* (2013.01); *G06F 1/1656* (2013.01); *G09G 5/005* (2013.01); *H04M 1/0237* (2013.01); *H04M 1/0268* (2013.01); *G09G 2340/04* (2013.01); *G09G 2354/00* (2013.01)

(58) Field of Classification Search
CPC ..................................................... G06F 1/1681
USPC ..................................................... 361/679.06
See application file for complete search history.

(56) References Cited

U.S. PATENT DOCUMENTS

| | | | | |
|---|---|---|---|---|
| 2006/0194619 A1* | 8/2006 | Wilcox | ................. | G06F 1/1601 |
| | | | | 455/566 |
| 2008/0198540 A1* | 8/2008 | Bemelmans | .......... | G06F 1/1615 |
| | | | | 361/679.06 |
| 2013/0058063 A1 | 3/2013 | O'Brien | | |
| 2016/0120022 A1 | 4/2016 | Lee et al. | | |
| 2016/0127525 A1 | 5/2016 | Lee et al. | | |

FOREIGN PATENT DOCUMENTS

KR         100867608         11/2008

OTHER PUBLICATIONS

European Patent Office Application Serial No. 17000329.7, Search Report dated Sep. 14, 2017, 14 pages.

* cited by examiner

*Primary Examiner* — Jerry Wu
(74) *Attorney, Agent, or Firm* — Lee, Hong, Degerman, Kang & Waimey

(57) ABSTRACT

A mobile terminal is disclosed. The mobile terminal includes a body including a first body and a second body fastened to the first body, the second body separable from the first body, a flexible display including a first flexible display connected to the second body and located on a front surface of the body and a second flexible display connected to the first flexible display and located on a rear surface of the body, and a guide sheet positioned in a rear surface of the flexible display and providing the flexible display with an elastic force. At least a portion of the second flexible display is located on the front surface of the body when the second body is separated from the first body.

19 Claims, 26 Drawing Sheets

(a)

(b)

(c)

(a)

(b)

(c)

MOBILE TERMINAL

Pursuant to 35 U.S.C. § 119(a), this application claims the benefit of earlier filing date and right of priority to Korean Patent Application No. 10-2016-0074462, filed on Jun. 15, 2016, the contents of which are all hereby incorporated by reference herein in its entirety.

BACKGROUND OF THE INVENTION

Field of the Invention

The present disclosure relates to a mobile terminal. More particularly, the present disclosure relates to a mobile terminal capable of reducing or extending a display screen.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, and the like.

Efforts are ongoing to support and increase the functionality of mobile terminals. Such efforts include software and hardware improvements, as well as changes and improvements in the structural components.

As the functions of mobile terminals have been recently enhanced for multimedia devices, the size of a display unit is increasing. As the size of the display unit increases, it is very inconvenient for a user to carry the mobile terminal.

SUMMARY OF THE INVENTION

Accordingly, an object of the present disclosure is to address the above-described and other problems.

Another aspect of the present disclosure is to provide a mobile terminal capable of improving portability by freely reducing or increasing a size of a display screen if necessary or desired.

In one aspect, there is provided a mobile terminal including a body including a first body and a second body fastened to the first body, the second body separable from the first body; a flexible display including a first flexible display, connected to the second body, located on a front surface of the body and a second flexible display, connected to the first flexible display, located on at least one of a rear surface of the body and a lateral surface of the body; and a guide sheet, positioned in a rear surface of the flexible display, providing the flexible display with an elastic force, wherein at least a portion of the second flexible display is located on the front surface of the body when the second body is separated from the first body.

The guide sheet may include a flat plate, contacting a rear surface of the flexible display, supporting the flexible display, and an elastic portion, positioned in a rear of the flat plate, providing the flat plate with the elastic force.

The guide sheet may further include a plurality of guide blocks protruding from a rear surface of the flat plate in a rearward direction and disposed to be spaced apart from one another by a predetermined distance, a fixing pin passing through a central portion of the elastic portion and fastened to the rear surface of the flat plate, and a fixing film laid on an end of the guide block.

The guide block may be coupled to the fixing film.

The plurality of guide blocks may be disposed in a longitudinal direction or a width direction of the flexible display.

The elastic portion may have an arch plate shape.

The mobile terminal may further include a side guide disposed in an inner space of the first body and guiding a frame on which a plurality of electronic components is mounted. The frame may include a side rib that has a protruding side and is accommodated in the side guide, and a hook fixing the frame coupled to the first body.

The frame may further include a display pole that is fastened to an end of the guide sheet. The guide sheet may be connected to one of the frame and the body. The guide sheet may be connected to the guide sheet. The guide sheet may provide the guide sheet with an elastic force which prohibits a separation of the second body from the first body.

The display pole may include a pole connected to the frame, a wire roller having a hollow portion into which the pole is inserted, a spring, and a wire winding on the wire roller. An end of the spring may be connected to one of the frame or the body or the pole, and another end of the spring may be connected to the wire roller. An end of the wire may be connected to the wire roller, and another end of the wire may be connected to the guide sheet.

The mobile terminal may further include a wire fixing portion disposed at one end of the flat plate and fastened to the wire, and a fixing protrusion disposed at the other end of the flat plate and fastened to the second body.

A coupling protrusion of a protruding shape and a coupling groove, into which the coupling protrusion is inserted, may be respectively formed at contact sides of the first body and the second body.

At least one of the coupling protrusion and the coupling groove may include a magnetic material.

At least a portion of the flexible display may include a display surface in a side direction of the mobile terminal when the second body is fastened to the first body.

The mobile terminal may further include a controller configured to change the flexible display from one of a landscape mode and a portrait mode to the other depending on a separation of the first and second bodies.

The mobile terminal may further include a controller configured to change an aspect ratio of an image displayed on the flexible display depending on a separation of the first and second bodies.

The flexible display may stay in one of states including a first state and a second state, wherein a portion of the flexible display is accommodated in the first body in the first state. The portion of the flexible display may be located outside the first body when the second body is separated from the first body.

In another aspect, there is provided a mobile terminal including a body including a first body and a second body separable from the first body; a flexible display stayed in one of states including a first state, in which a portion of the flexible display is accommodated in the first body, and a second state, in which the portion of the flexible display is extended to outside of the first body depending on a separation between the first and second bodies; and a guide sheet supporting the flexible display at a rear surface of the flexible display, wherein a display surface of the flexible display is positioned in a forward direction and a rearward direction of the body in the first state, and a display surface of the flexible display is positioned in the forward direction of the body in the second state, wherein the guide sheet includes a flat plate contacting a rear surface of the flexible display and an elastic portion providing an elastic force in the forward direction of the body at a rear surface of the flat plate.

At least a portion of the flexible display may further include a display surface in a side direction of the mobile terminal in at least one of the first state and the second state.

The mobile terminal may further include a controller configured to change the flexible display from one of a landscape mode and a portrait mode to the other depending on a state change of the flexible display.

The mobile terminal may further include a controller configured to change an aspect ratio of an image displayed on the flexible display depending on a state change of the flexible display.

According to at least one aspect of the present disclosure, the present disclosure can improve portability of the mobile terminal and easily perform multitasking by freely reducing or increasing a size of a display screen if necessary or desired.

Additional features and advantages of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
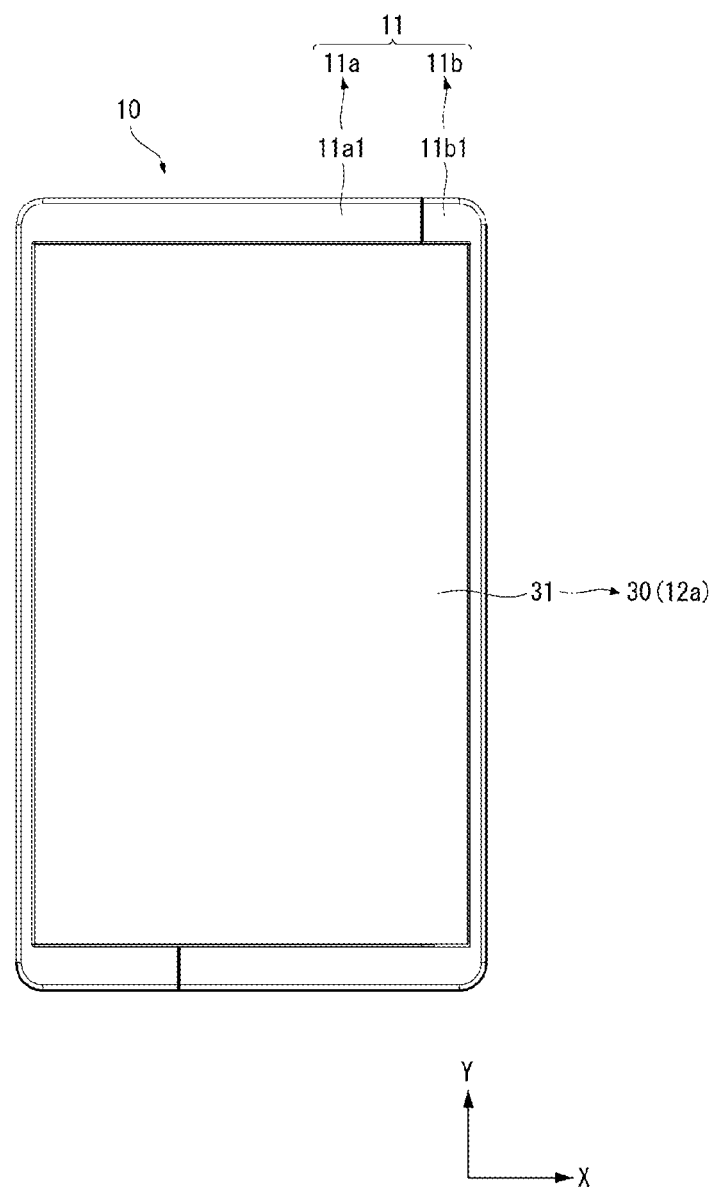
FIG. 1 is a front view of a mobile terminal according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Mobile terminals disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, and the like.

Figure 2:
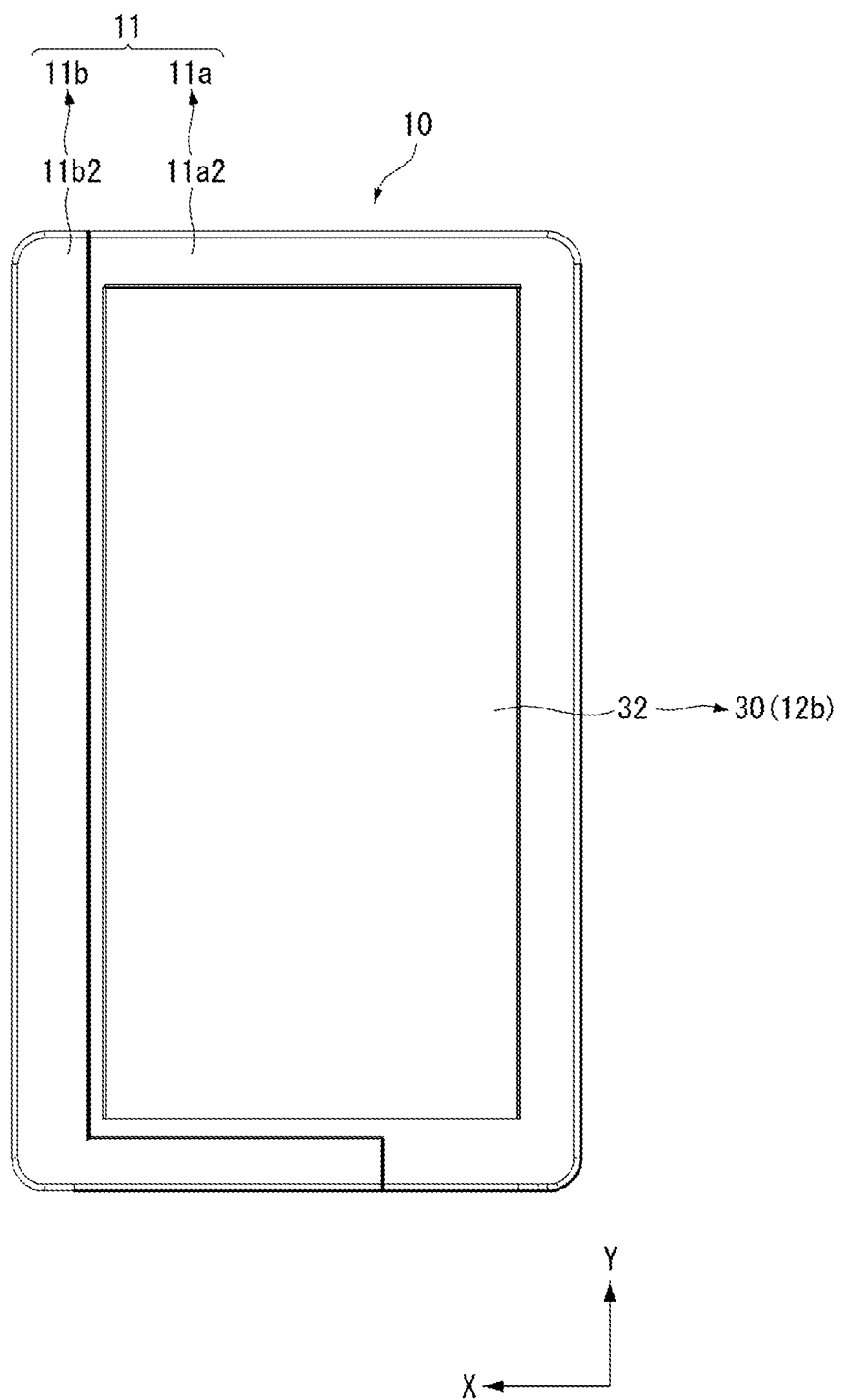
FIG. 2 is a back view of a mobile terminal according to an embodiment of the invention.

FIG. 1 is a front view of a mobile terminal according to an embodiment of the invention, and FIG. 2 is a back view of a mobile terminal according to an embodiment of the invention.

Referring to FIGS. 1 and 2, a mobile terminal 10 according to an embodiment of the invention includes a bar-shaped body 11.

The mobile terminal 10 includes the body 11 forming an appearance. The body 11 may include a frame, a housing, a cover, and the like. The body 11 may include a first body 11a and a second body 11b.

The first body 11a of the mobile terminal 10 may include a first front body 11a1 and a first rear body 11a2. The second body 11b of the mobile terminal 10 may be coupled to or separated from the first body 11a. The second body 11b may include a second front body 11b1 and a second rear body 11b2.

The first body 11a includes an inner space formed by a coupling between the first front body 11a1 and the first rear body 11a2. Various electronic components are disposed in the inner space of the first body 11a. A frame 11c (see FIG. 5) may be disposed between the first front body 11a1 and the first rear body 11a2. The various electronic components disposed in the inner space may include a printed circuit board (PCB) 14 on which a controller is mounted, a flexible printed circuit board (FPCB) 14a (see FIG. 10), a battery detachable portion 15, a power supply unit, an antenna 16, an identification module, a memory card, and the like. If necessary or desired, the electronic components may be disposed in the first rear body 11a2. A display pole 22 (see FIG. 8) may be disposed in the inner space of the first body 11a. The display pole 22 may be configured such that a flexible display 30 is disposed in the inner space of the first body 11a while controlling a screen size of the flexible display 30.

The first body 11a may include first and second audio output units, a proximity sensor, an illumination sensor, an optical output unit, first and second cameras, first to third operation units, a microphone, an interface unit, an earphone jack, etc. The flexible display 30 may be disposed on the first front body 11a1 of the mobile terminal 10, and the first audio output unit, the proximity sensor, the illumination sensor, the optical output unit, the first camera, the first operation unit, etc. may be disposed in a bezel area. In embodiments disclosed herein, the bezel area may be defined as a remaining area excluding a screen displayed on the mobile terminal 10.

The second body 11b includes an inner space formed by a coupling between the second front body 11b1 and the second rear body 11b2. A portion of a guide sheet 20, (see FIG. 6) that will be described later, may be accommodated and mounted in the inner space of the second body 11b. The second body 11b may be coupled to or separated from the first body 11a in a sliding manner The flexible display 30 may be disposed on the first rear body 11a2 of the mobile terminal 10, and also the second audio output unit, the second camera, the third operation unit, etc. may be disposed in the first rear body 11a2.

The first body 11a and the second body 11b may be formed by the injection molding of synthetic resin, or may be formed of metal, and the like. For example, the first body 11a and the second body 11b may be formed of metal such as stainless steel (STS), aluminum (Al), titanium (Ti).

The flexible display 30 may be disposed on a front surface or a rear surface of the body 11 of the mobile terminal 10. The flexible display 30 may be accommodated at a lower side of the first body 11a. The flexible display 30 may be made of a plastic organic light emitting diode (POLED) material providing the flexible display 30 with good flexibility.

The flexible display 30 may display (or output) information processed by the mobile terminal 10. For example, the flexible display 30 may display execution screen information of an application program executed by the mobile terminal 10, or user interface (UI) information and graphic user interface (GUI) information in accordance with the execution screen information.

The flexible display 30 may include a touch sensor (not shown) so that the flexible display 30 receives a control command in accordance with a touch. The touch sensor may sense a touch input of the flexible display 30. When a touch input of the flexible display 30 is performed, the touch sensor can accurately sense a position of the touch input. A controller 180 (see FIG. 26) may produce a control command corresponding to the touch input based on the touch position sensed by the touch sensor. The contents input in accordance with the touch manner may include a letter or a number, an instruction in various modes, a menu item that can be designated, and the like. The touch sensor may be configured in the form of a film having a touch pattern. The touch sensor may be disposed on a substrate of the flexible display 30 or embedded in the flexible display 30.

As described above, the flexible display 30 and the touch sensor may form a touch screen. In this instance, the touch screen may serve as a user input unit. If necessary or desired, the touch screen may perform at least a portion of a function of the first operation unit.

Figure 3:
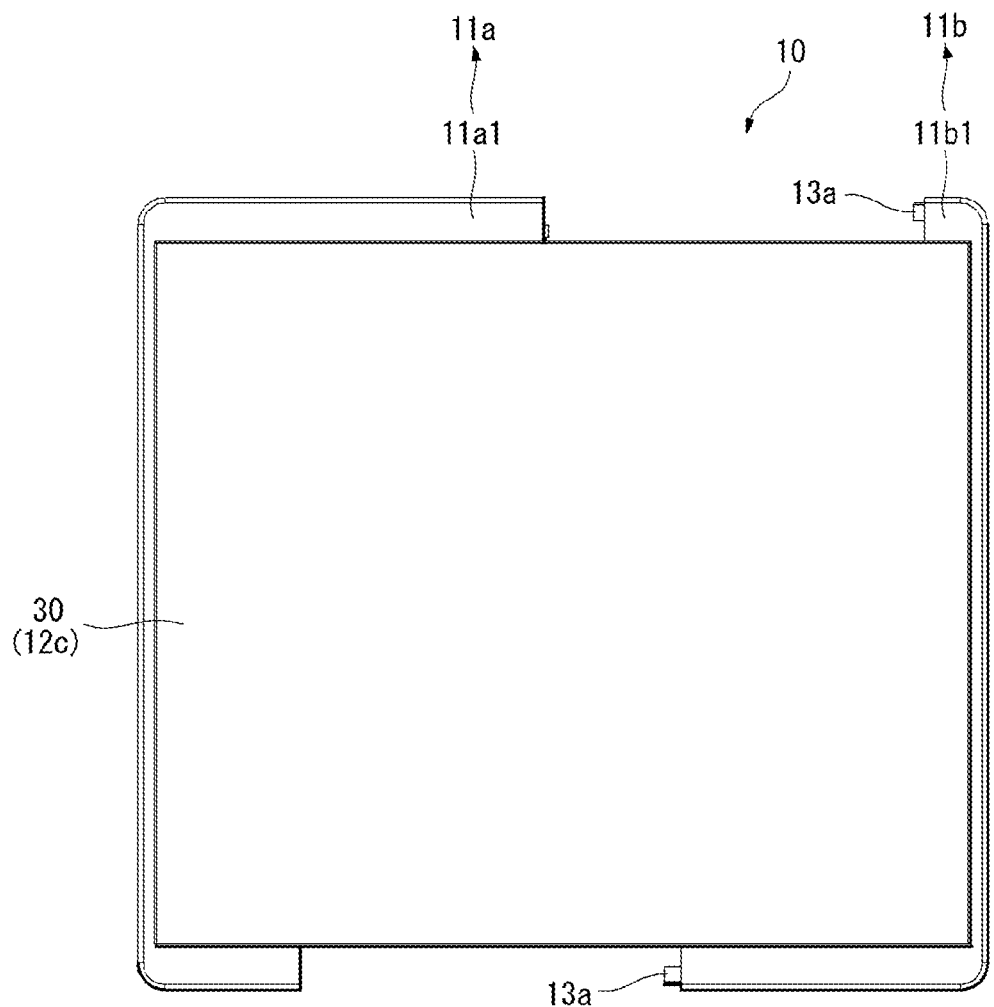
FIG. 3 is a front view illustrating that a flexible display of a mobile terminal according to an embodiment of the invention is extended.

FIG. 3 is a front view illustrating that the flexible display of the mobile terminal according to the embodiment of the invention is extended.

Referring to FIGS. 1 to 3, the flexible display 30 may operate in a first state and a second state. The first state may indicate a close scene before the screen of the mobile terminal 10 is extended, and the second state may indicate an open scene after the screen of the mobile terminal 10 is extended.

The flexible display 30 may be in the first state where a portion of the flexible display 30 is accommodated in the first body 11a, and may be in the second state where a portion of the flexible display 30 accommodated in the first body 11a is extended to the outside depending on a separation distance between the first and second bodies 11a and 11b.

In the first state, a portion of the flexible display 30 may be accommodated in the first body 11a, a display surface of the flexible display 30 at the front may have a first screen size 12a, and a display surface of the flexible display 30 in the rear may have a second screen size 12b. Namely, in the first state, the display surface of the flexible display 30 may be positioned in a forward direction and a rearward direction of the body 11. The flexible display 30 may include a first flexible display 31 and a second flexible display 32. The flexible display 30 shown at the front of the mobile terminal 10 may be referred to as a first flexible display. The first flexible display may be located on a front surface of the body 11. The flexible display 30 shown at the rear of the mobile terminal 10 may be referred to as a second flexible display. The second flexible display may be located on at least one of a rear surface of the body 11 or a lateral surface of the body. The first flexible display 31 may be connected to the second flexible display 32.

In the second state, the first body 11a and the second body 11b may be spaced apart from each other by a predetermined distance, and a portion of the flexible display 30 accommodated in the first body 11a may be extended to the outside and may have a third screen size 12c greater than the first and second screen sizes 12a and 12b. Namely, in the second state, the display surface of the flexible display 30 may be positioned in the forward direction of the body 11.

The second body 11b may include at least one coupling protrusion 13a in a coupling portion coupled to the first body 11a. For example, the coupling protrusions 13a may be respectively disposed at an upper side and a lower side of the second body 11b. The coupling protrusions 13a can prevent the second body 11b from being temporarily released from the first body 11a while the second body 11b is coupled to the first body 11a.

A portion of a first screen 12a disposed on the first front body 11a1 corresponding to the front surface of the first body 11a or a portion of a second screen 12b disposed on the first rear body 11a2 corresponding to the rear surface of the first body 11a may be displayed at any time.

Hence, information about date, time, and weather may be displayed on a portion of the first screen 12a or a portion of the second screen 12b at any time. Further, the notification of SNS message, test message, and email may be displayed on a portion of a first screen 12a or a portion of a second screen 12b.

Figure 4:
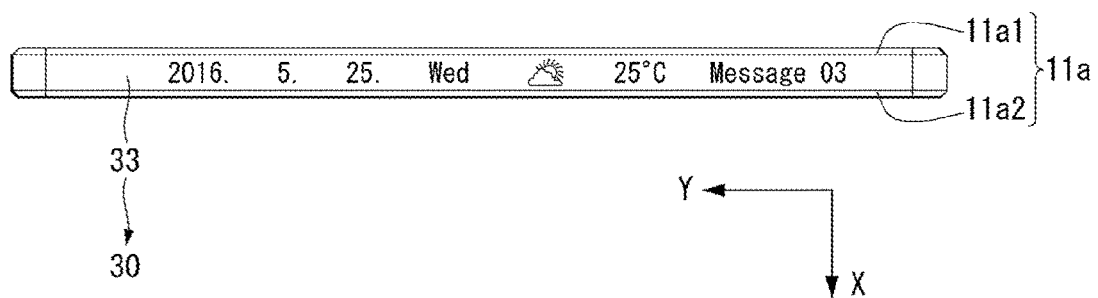
FIG. 4 is a side view of a mobile terminal according to an embodiment of the invention.

FIG. 4 is a side view of the mobile terminal according to the embodiment of the invention.

Referring to FIG. 4, the flexible display 30 bent at the side of the first body 11a of the mobile terminal 10 may be displayed through the side of the first body 11a of the mobile terminal 10. In embodiments disclosed herein, the side of the first body 11a may be a side that is not coupled to the second body 11b.

The side of the first body 11a may be formed of a transparent material, so as to display the flexible display 30. The flexible display 30 may display simple information, that the user frequently uses, on the side of the first body 11a at any time. For example, the flexible display 30 may display information about date, time, and weather at any time, and may display the notification of SNS message, test message, and email. The flexible display 30 located on the side of the first body 11 in the first state, may be referred to as a third flexible display 33. The third flexible display may connect the first flexible display 31 and the second flexible display 32.

The side of the first body 11a may be formed of an opaque material. When the side of the first body 11a is formed of the opaque material, the flexible display 30 is not displayed on the side of the first body 11a.

When the side of the first body 11a is formed of the transparent material, the second operation unit, the microphone, the interface unit, and the earphone jack may be disposed at an upper surface or a lower surface of the first body 11a of the mobile terminal 10.

Alternatively, when the side of the first body 11a is formed of the opaque material, the second operation unit, the microphone, the interface unit, and the earphone jack may be disposed at one of the upper surface, the lower surface, and the side of the first body 11a of the mobile terminal 10.

The configurations of the mobile terminal 10 described so far are not limited to the above-described arrangements. The configurations of the mobile terminal 10 may be excluded or changed, if necessary or desired. For example, the first front body 11a1 of the mobile terminal 10 may not include the first operation unit, and the second audio output unit 152b may be disposed at not the rear surface but the side of the body 11.

Figure 5:
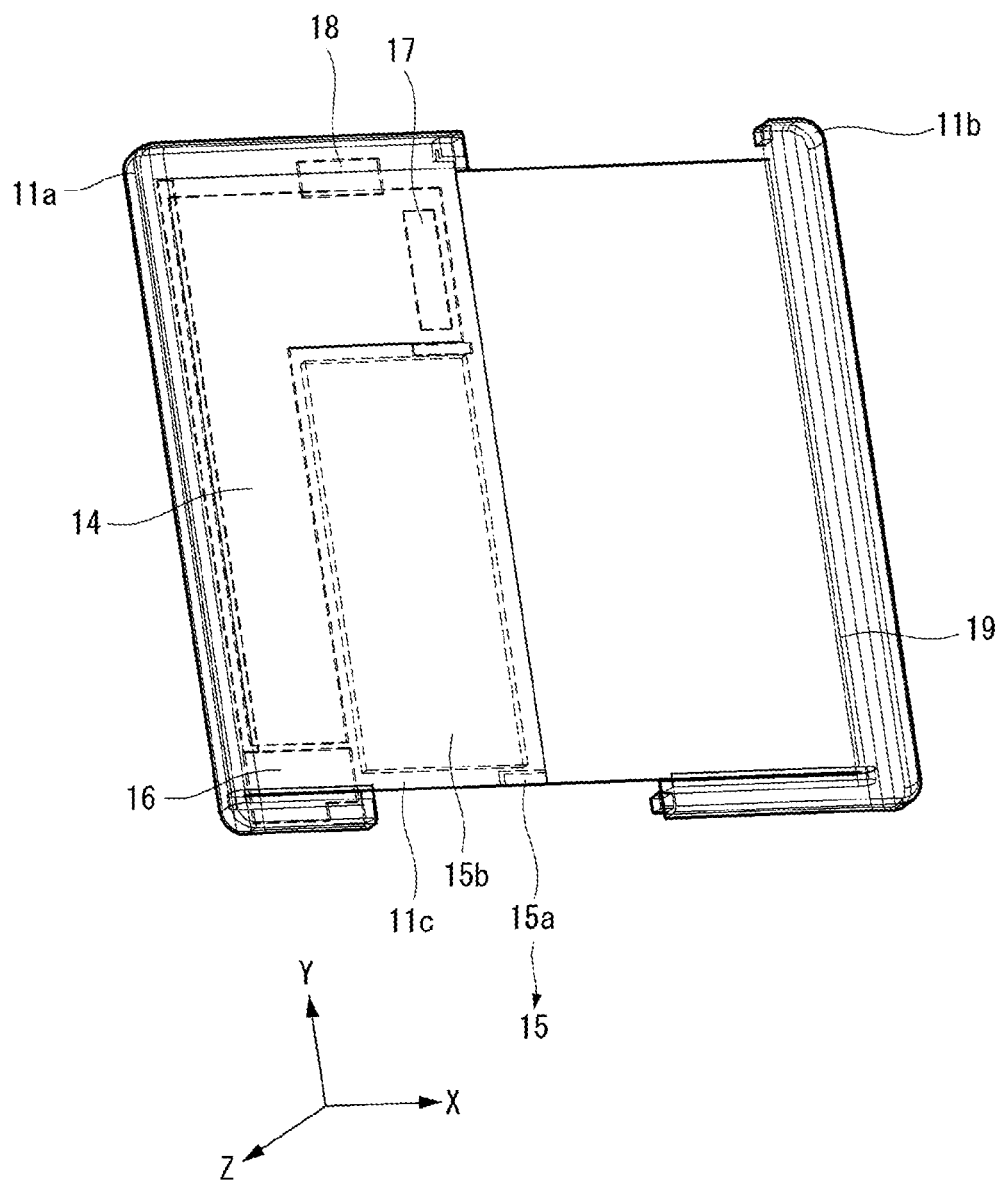
FIG. 5 illustrates an inner space of a mobile terminal according to an embodiment of the invention.

FIG. 5 illustrates an inner space of the mobile terminal according to the embodiment of the invention.

Referring to FIG. 5, the frame 11c may be disposed between the first front body 11a1 and the first rear body 11a2. The frame 11c may fix the PCB 14, the FPCB 14a (see FIG. 10), the battery detachable portion 15, a display connector 17, the antenna 16, a speaker 18, etc. that are disposed in an inner space of the first body 11a.

The controller may be mounted on the PCB 14, and the PCB 14 may be disposed to be fixed to the frame 11c.

The FPCB 14a (see FIG. 10) may be disposed between the flexible display 30 and the PCB 14 and may electrically connect them. One end of the FPCB 14a (see FIG. 10) may be connected to the flexible display 30, and the other end may be connected to the PCB 14. The FPCB 14a (see FIG. 10) may be round bent corresponding to the flexible display 30 that is at different positions in the first state and the second state.

Figure 10:
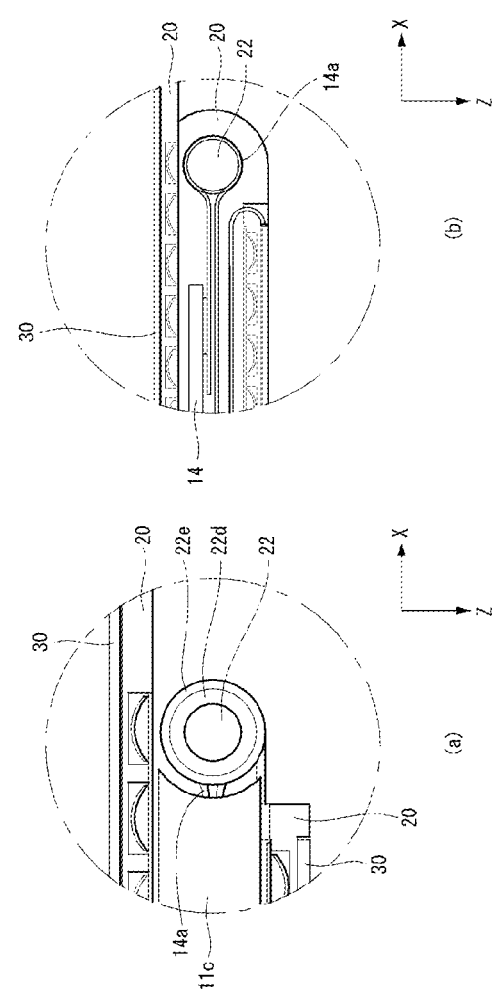
FIG. 10 is a side view of a display pole shown in FIG. 9.

The display connector 17 may be disposed between the PCB 14 and the FPCB 14a (see FIG. 10). The display connector 17 may electrically connect the fixed PCB 14 to the FPCB 14a (see FIG. 10), that moves while being round bent.

The battery detachable portion 15 may be disposed not to overlap the PCB 14, and a battery 15b may be mounted on or detached from the battery detachable portion 15. The battery detachable portion 15 may further include a battery switch 15a, so as to easily attach and detach the battery 15b to and from the battery detachable portion 15. The battery detachable portion 15 is not limited thereto. For example, the battery 15b may be embedded in the mobile terminal 10. When the embedded battery 15b is used, the battery switch 15a may be omitted in the battery detachable portion 15.

The antenna 16 may be positioned at the lower side of the PCB 14. The antenna 16 may be disposed not to overlap the battery detachable portion 15.

The display pole 22 (see FIG. 8) may be disposed at another side of the first body 11a opposite a side of the first body 11a coupled to the second body 11b. The display pole 22 may round bend the flexible display 30 and may accommodate the flexible display 30 in the inner space of the first body 11a.

Figure 6:
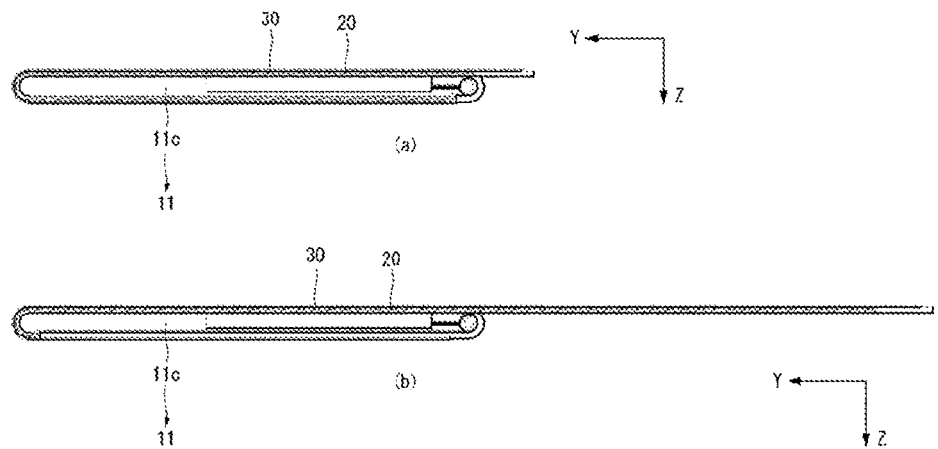
FIG. 6 illustrates that a mobile terminal according to an embodiment of the invention operates in a first state or a second state.

The second body 11b may include a display holder 19 that accommodates a portion of the guide sheet 20 (see FIG. 6) and mounts the guide sheet 20 (see FIG. 6). The display holder 19 may be disposed in an inner space between the second front body 11b1 and the second rear body 11b2, may mount the guide sheet 20 (see FIG. 6), and may fix the guide sheet 20. The display pole 22 may move together with the flexible display 30 while the second body 11b slides, and the flexible display 30 is extended in the second state.

The speaker 18 may be disposed to overlap the PCB 14 at the upper side of the PCB 14. The speaker 18 may be disposed between the first front body 11a1 and the frame 11c or between the first rear body 11a2 and the frame 11c.

FIG. 6 illustrates that the mobile terminal according to the embodiment of the invention operates in a first state or a second state.

Referring to FIGS. 1, 2, and 6, the flexible display 30 may be in the first state where a portion of the flexible display 30 is accommodated in the first body 11a, and may be in the second state where a portion of the flexible display 30 accommodated in the first body 11a is extended to the outside depending on the separation distance between the first and second bodies 11a and 11b. In the first state, a portion of the flexible display 30 may be accommodated in the first body 11a, the flexible display 30 at the front may have the first screen 12a, and the flexible display 30 in the rear may have the second screen 12b. In the second state, the first body 11a and the second body 11b may be spaced apart from each other by a predetermined distance, and a portion of the flexible display 30 accommodated in the first body 11a may be extended to the outside and may have the third screen 12c larger than the first and second screen 12a and 12b.

In the first state, the flexible display 30 shown in (a) of FIG. 6 may be round bent by the display pole 22 (see FIG. 8) disposed inside the first body 11a and may be accommodated in the inner space of the first body 11a. Hence, the flexible display 30 may be displayed on both the front surface and the rear surface of the body 11 of the mobile terminal 10.

In the second state, the flexible display 30 shown in (b) of FIG. 6 may be extended to the front surface of the body 11 of the mobile terminal 10 and displayed.

Figure 7:
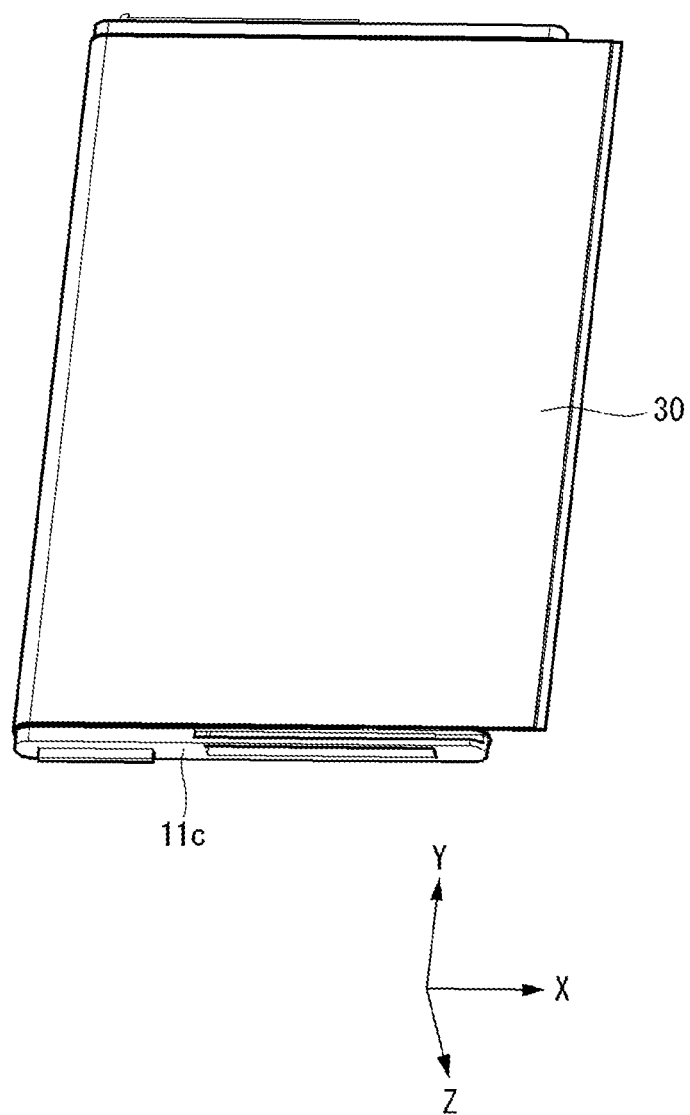
FIG. 7 is a perspective view of a flexible display mounted on a guide sheet according to an embodiment of the invention.
Figure 8:
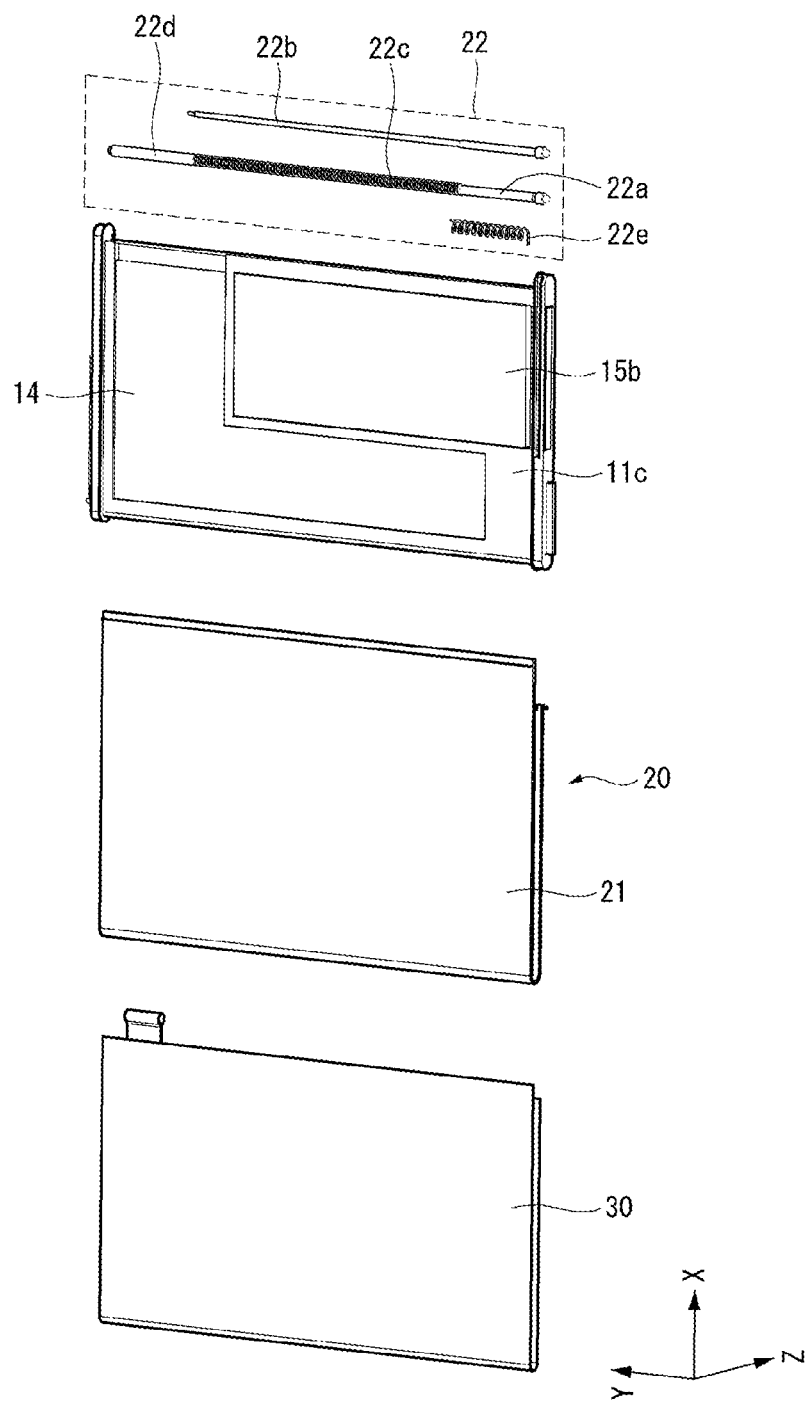
FIG. 8 is an exploded view of a flexible display shown in FIG. 7.
Figure 9:
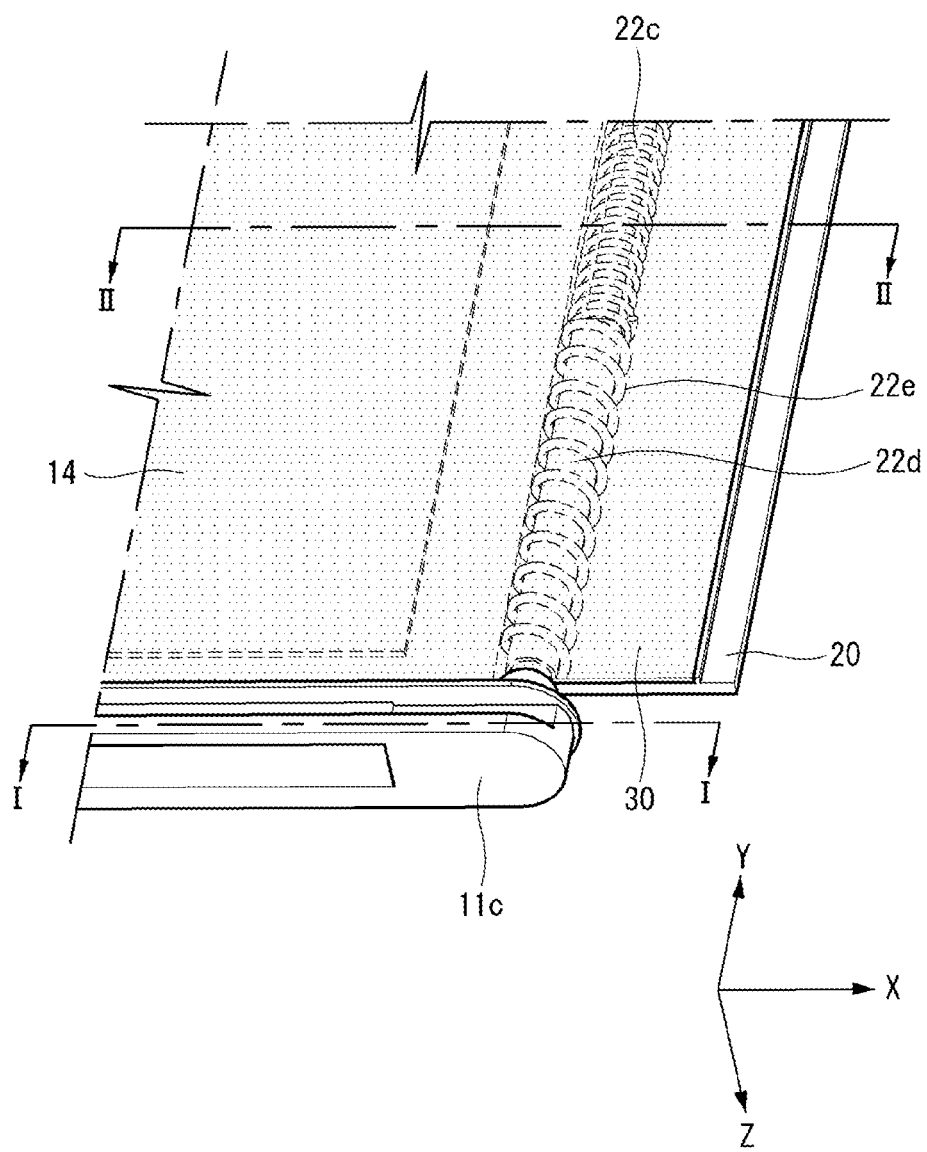
FIG. 9 illustrates a display pole mounted on a main body.

FIG. 7 is a perspective view of the flexible display mounted on the guide sheet according to the embodiment of the invention, and FIG. 8 is an exploded view of the flexible display shown in FIG. 7. FIG. 9 illustrates the display pole mounted on the frame, and FIG. 10 is a side view of the display pole shown in FIG. 9.

Referring to FIGS. 7 and 8, the guide sheet 20 may be disposed on the rear surface of the flexible display 30 and may support the flexible display 30.

The guide sheet 20 may be mounted on the frame 11c and then coupled to the first body 11a.

The frame 11c may mount the display pole 22 before the guide sheet 20 is fastened to the frame 11c. The frame 11c may be sequentially fastened to the PCB 14 and the battery detachable portion 15 after the frame 11c mounts the display pole 22.

The display pole 22 may be disposed at one side of the frame 11c. The display pole 22 may include a first pole 22a, a second pole 22b, a spring 22c, and a wire roller 22d.

The first pole 22a may be formed in a cylindrical shape having a circular side cross section. The second pole 22b may be formed in a cylindrical shape having a circular side cross section. The first pole 22a and the second pole 22b may be separated from each other and may be assembled using a screw. The wire roller 22d for fixing the spring 22c and a wire 22e may be inserted between the first pole 22a and the second pole 22b. One end of the wire 22e may be riveted to the wire roller 22d, and the other end may be fastened and fixed to a flat plate 21 of the guide sheet 20. At least one of the first pole 22a and the second pole 22b is referred to as a 'pole'. The wire roller has a hollow portion into which the pole is inserted. That is, the pole may be inserted into the wire roller. An end of the spring 22c may be connected to the wire roller 22d. Another end of the spring 22c may be connected to one of the frame 11c and the pole.

The display pole 22 thus configured may fix the wire 22e to the flat plate 21 and the wire roller 22d and then may be driven using a force of the spring 22c. The display pole 22 may operate to unwind the wire 22e wound on the wire roller 22d while the flexible display 30 is changed from the first state to the second state. In this instance, the display pole 22 may be driven by a force of the user.

Unlike this, the display pole 22 may operate to wind again the unwound wire 22e on the wire roller 22d while the flexible display 30 is changed from the second state to the first state. In this instance, the display pole 22 may operate by itself using a force of the spring 22c mounted on the display pole 22.

As shown in FIG. 9 and (a) of FIG. 10 that is a cross-sectional view taken along line I-I of FIG. 9, the wire 22e may be fixed to the flat plate 21 of the guide sheet 20, and then the wire 22e may be wound on the wire roller 22d and rivet its end to the wire roller 22d. As the wire 22e is wound on or unwound from the wire roller 22d depending on a moving location of the flexible display 30, a length of the wire 22e can be adjusted.

As shown in (b) of FIG. 10 that is a cross-sectional view taken along line II-II of FIG. 9, the flexible display 30 fastened to the wire 22e and a display module may be fastened to the frame 11c. When the flexible display 30 is fastened to the frame 11c, the FPCB 14a may be accommodated in the frame 11c. The FPCB 14a may be rounded at the upper side of the display pole 22 and may electrically connect the flexible display 30 to the PCB 14.

When the FPCB 14a is electrically connected to the PCB 14, the FPCB 14a may be driven. When the flexible display 30 is changed from the first state to the second state or from the second state to the first state, the flexible display 30 may move from side to side. The FPCB 14a may be extended by a moving distance when the flexible display 30 moves from side to side, and may be accommodated in the inner space of the first body 11a. In order to more secure the connection between the FPCB 14a moving along the flexible display 30 and the PCB 14 fixed to the frame 11c, the display connector 17 may be disposed between the FPCB 14a and the PCB 14.

In order to previously prevent the disconnection between the FPCB 14a and the PCB 14 while the FPCB 14a moves from side to side in response to the movement of the flexible display 30, the FPCB 14a may operate in a state where a portion of the FPCB 14a is wound on the upper side of the display pole 22. Hence, when the flexible display 30 moves from side to side, the FPCB 14a may be bended to the display pole 22 in response to the movement of the flexible display 30 and may be accommodated or extended.

Figure 11:
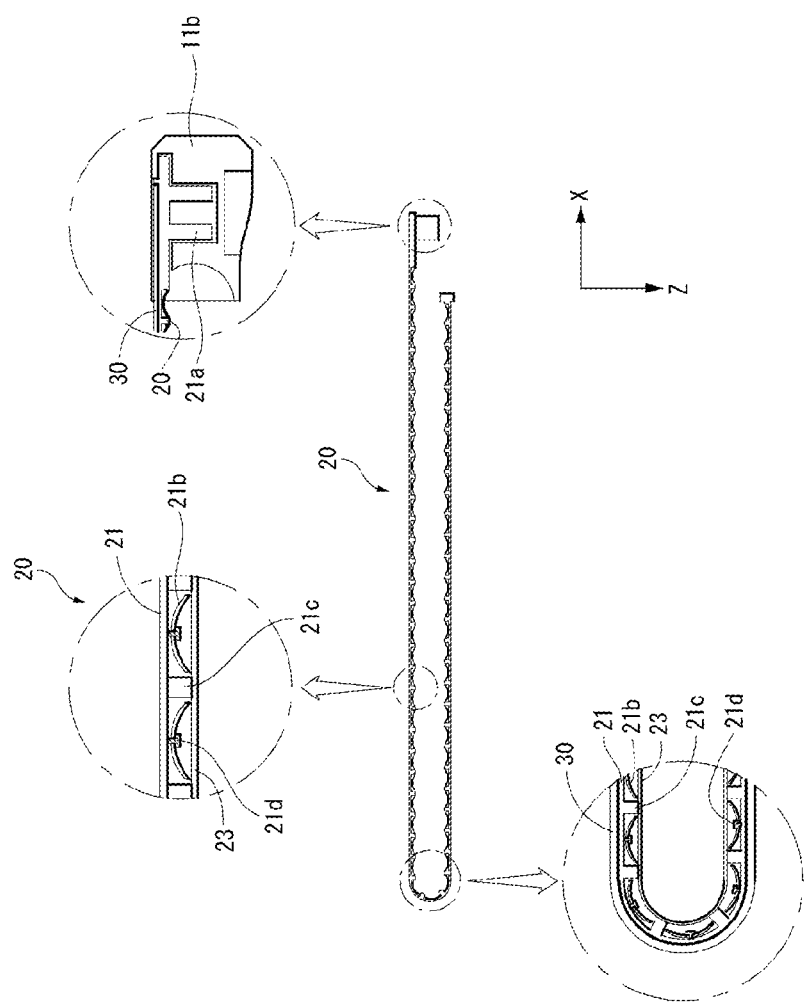
FIG. 11 illustrates a guide sheet according to an embodiment of the invention.
Figure 12:
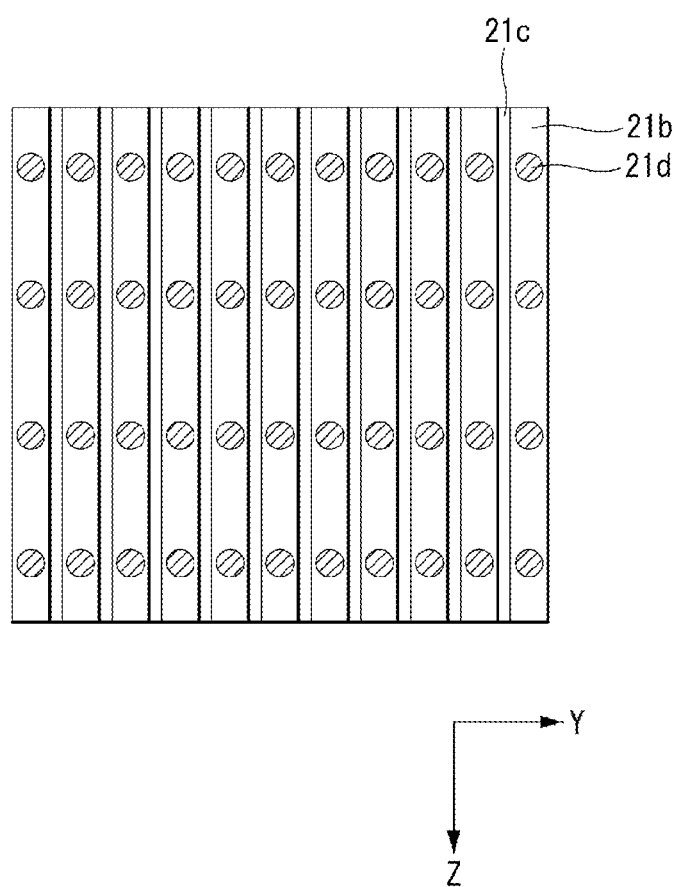
FIG. 12 illustrates an elastic portion and a fixing pin disposed on a rear surface of a flat plate in accordance with an embodiment of the invention.

FIG. 11 illustrates the guide sheet according to the embodiment of the invention. FIG. 12 illustrates an elastic portion and a fixing pin disposed on a rear surface of a flat plate in accordance with the embodiment of the invention.

The guide sheet 20 may operate to smoothly extend the flexible display 30 while the flexible display 30 is changed from a close scene corresponding to the first state to an open scene corresponding to the second state. The guide sheet 20 may operate so that the flexible display 30 is unfolded and flat while the flexible display 30 maintains the second state.

It may be advantageous to use a hard material so that the flexible display 30 is unfolded and flat. However, when the hard material is used, it may be difficult to bend the flexible display 30 in the first state. On the contrary, it may be advantageous to use a soft material so as to bend the flexible display 30. However, when the soft material is used, it may be difficult to make the flexible display 30 unfolded and flat in the second state.

The guide sheet 20 may be configured as follows such that the flexible display 30 is bent in the first state and is flat unfolded in the second state.

Referring to FIGS. 11 and 12, the guide sheet 20 may include the flat plate 21, an elastic portion 21b, a guide block 21c, and a fixing pin 21d.

The flat plate 21 of the guide sheet 20 may be disposed to contact the rear surface of the flexible display 30. The flat plate 21 may be round bent during the first state of the flexible display 30. The flat plate 21 may support the flexible display 30 during the second state of the flexible display 30 so that the flexible display 30 between the first body 11a and the second body 11b is flat unfolded.

A wire fixing portion may be disposed at one end of the flat plate 21, and a fixing protrusion 21a may be disposed at the other end of the flat plate 21. The wire fixing portion may be fixed to the wire 22e fastened to the display pole 22. The fixing protrusion 21a may be accommodated in the inner space of the second body 11b and may fix the other end of the flat plate 21 to the second body 11b.

When the flexible display 30 moves from side to side, the other end of the flat plate 21 may move together with the second body 11b. The other end of the flat plate 21 and the second body 11b may be subjected to a force in the same sliding direction. Hence, a high shear force is required between the flat plate 21 and the second body 11b. The flat plate 21 may be provided with the fixing protrusion 21a at the other end so as to secure the high shear force between the flat plate 21 and the second body 11b.

The fixing protrusion 21a may be formed in an uneven shape, and the second body 11b may be formed in an uneven shape at a position corresponding to the fixing protrusion 21a. When the flat plate 21 and the second body 11b are coupled to each other through the fixing protrusion 21a, they may be fastened to each other once again using a screw. Hence, the second body 11b can more firmly accommodate the flat plate 21.

The plurality of elastic portions 21b may be disposed on a rear surface of the flat plate 21. The elastic portions 21b may provide an elastic force in a direction from the rear surface to a front surface of the flat plate 21. The elastic portion 21b may be formed in a concave shape from the rear surface toward the front surface of the flat plate 21. A side cross section of the elastic portion 21b may be formed in an arch plate shape. Namely, the side cross section of the elastic portion 21b may be formed in a crescent shape.

The plurality of guide blocks 21c may be disposed on the rear surface of the flat plate 21. Each guide block 21c may be disposed between the adjacent elastic portions 21b. The guide block 21c may be formed in a convex shape from the front surface toward the rear surface of the flat plate 21. The guide block 21c may be formed in a rectangular column shape having a rectangular side cross section. The guide block 21c may be disposed between the elastic portions 21b such that the flat plate 21 is not bent more than a predetermined angle. Further, the guide block 21c and the elastic portion 21b may support the flat plate 21 so that the flat plate 21 is kept flat.

The plurality of guide blocks 21c may be spaced apart from one another by a predetermined distance in a horizontal direction and/or a vertical direction of the flexible display 30. Thus, even if a pressure is applied to any portion of the flexible display 30, the guide blocks 21c can effectively absorb and/or disperse the pressure.

The guide blocks 21c may be fixed to a fixing film 23. A space, in which the elastic portions 21b are positioned and/or operate, can be secured by the guide blocks 21c each having a predetermined rigidity. Further, even if an external force is applied, the entire shape of the guide sheet 20 can be prevented from being deformed more than a predetermined degree or more by the guide blocks 21c each having the predetermined rigidity.

The fixing pin 21d may fix the elastic portion 21b on the rear surface of the flat plate 21. More specifically, the fixing pin 21d may pass through a central portion of the elastic portion 21b and may be fastened to the rear surface of the flat plate 21, thereby fixing the elastic portion 21b.

The fixing film 23 may be stacked on ends of the guide blocks 21c disposed on the rear surface of the flat plate 21. The fixing film 23 may be fixed to the ends of the guide blocks 21c using a fastening member. The fastening member may include an adhesive. The fastening member may use any product as long as the fastening member can firmly fix the fixing film 23 to the ends of the guide blocks 21c.

Because the fixing film 23 is stacked on the ends of the plurality of guide blocks 21c as described above, the elastic portions 21b can be prevented from being arbitrarily detached. Furthermore, because the fixing film 23 can prevent foreign matter from entering the elastic portion 21b in advance, a performance of the elastic portion 21b can be prevented from being reduced due to the foreign matter.

The flexible display 30 may be bent in the first state and may be flat unfolded in the second state in accordance with the following conditions of the guide sheet 20 configured as described above.

The elastic portion 21b having the arch plate shape may have a predetermined radius of curvature (hereinafter, referred to as "R value"). The flat plate 21 may have a predetermined thickness. The fixing pin 21d may firmly fix the central portion of the elastic portion 21b to the rear surface of the flat plate 21. The fixing film 23 may be fixed to the end of the guide block 21c and may support the elastic portion 21b. When a force is applied to the flat plate 21 in the rearward direction, the elastic portion 21b may generate a property of restoring in the opposite direction in accordance with the R value of the elastic portion 21b. Thus, the elastic portion 21b can strongly generate a restoring force due to elasticity in the forward direction, thereby preventing the flexible display 30 from bending in advance. The guide sheet 20 may firmly couple the central portion of the elastic portion 21b of the arch plate shape to the rear surface of the flat plate 21 using the fixing pin 21d and may support the elastic portion 2 1b using the fixing film 23. Hence, the guide sheet 20 may guide the flexible display 30 to smoothly bend in the first state using the elastic force of the elastic portion 21b and guide the flexible display 30 to be flat unfolded in the second state.

Figure 13:
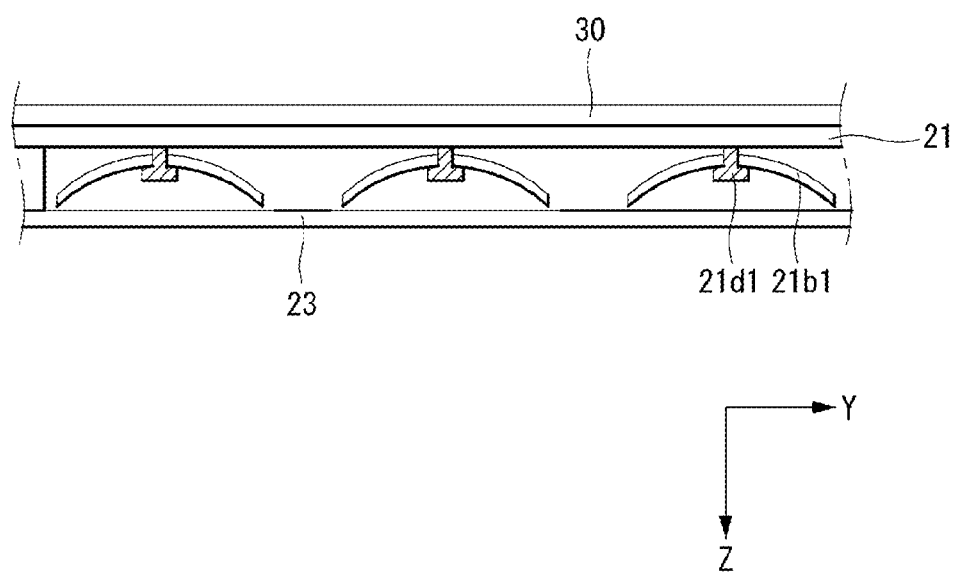
FIGS. 13 and 14 illustrate a guide sheet according to another embodiment of the invention.
Figure 14:
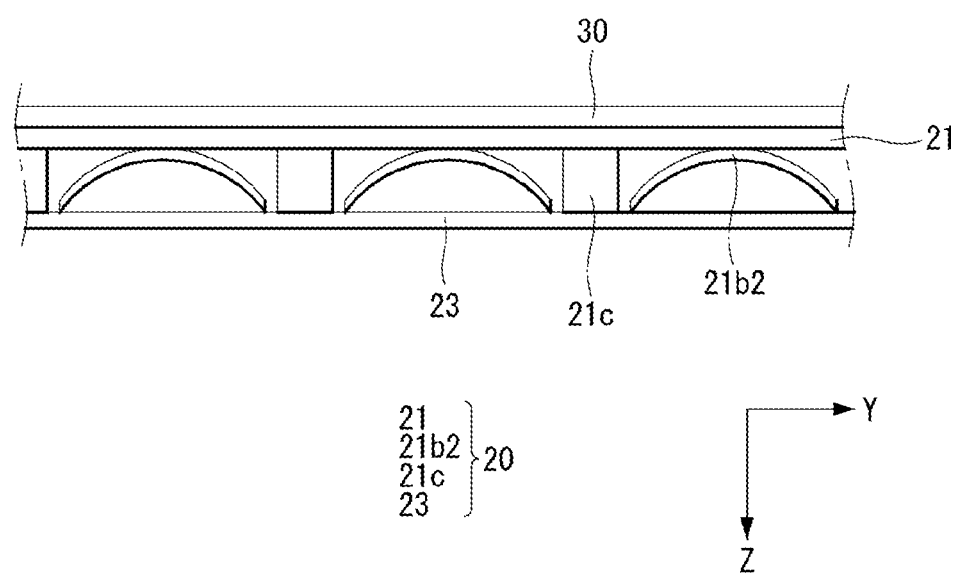

FIGS. 13 and 14 illustrate a guide sheet according to another embodiment of the invention.

Referring to FIG. 13, a guide sheet 20 may include a flat plate 21, an elastic portion 21b1, a fixing pin 21d1, and a fixing film 23. Since configurations of the flat plate 21 and the fixing pin 21d1 shown in FIG. 13 are substantially the same as the flat plate 21 and the fixing pin 21d shown in FIG. 11, a further description may be briefly made or may be entirely omitted.

The plurality of elastic portions 21b1 may be disposed and provide an elastic force in a direction from a rear surface to a front surface of the flat plate 21. A side cross section of the elastic portion 21b1 may be formed in an arch plate shape. The elastic portion 21b1 shown in FIG. 13 may be formed in the form of the arch plate larger than the elastic portion 21b shown in FIG. 11. The elastic portion 21b1 shown in FIG. 13 may have almost the same R value as the elastic portion 21b shown in FIG. 11. Thus, the elastic portion 21b1 may have a restoring force stronger than the elastic portion 21b shown in FIG. 11. As a result, the elastic portion 21b1 can more strongly prevent the flexible display 30 from bending in advance.

Referring to FIG. 14, a guide sheet 20 may include a flat plate 21, an elastic portion 21b2, a guide block 21c, and a fixing film 23. Since configurations of the flat plate 21 and the elastic portion 21b2 shown in FIG. 14 are substantially the same as the flat plate 21 and the elastic portion 21b shown in FIG. 11, a further description may be briefly made or may be entirely omitted.

The elastic portion 21b2 may be fixed to a rear surface of the flat plate 21 and may be disposed between the guide blocks 21c by a fixing film 23 stacked on an end of the guide block 21c.

The guide block 21c may be disposed between the elastic portions 21b2 on the rear surface of the flat plate 21.

The guide block 21c may be formed in a convex shape from a front surface toward a rear surface of the flat plate 21. The guide block 21c may be formed in a rectangular column shape having a rectangular side cross section. The guide block 21c may be disposed between the elastic portions 21b2 such that the flat plate 21 is not bent more than a predetermined angle. As described above, because the guide sheet 20 is configured so that the flat plate 21 is not bent more than the predetermined angle through the guide block 21c, the guide sheet 20 can prevent the flexible display 30 from being damaged by the bending of the flexible display 30 more than the predetermined angle. In addition, the guide sheet 20 may guide the flexible display 30 to smoothly bend in the first state using an elastic force of the elastic portion 21b2 and guide the flexible display 30 to be flat unfolded in the second state.

FIGS. 11 and 14 illustrate that the elastic portion 21b and the guide block 21c are sequentially disposed on the rear surface of the flat plate 21, by way of example. However, embodiments of the invention are not limited thereto. For example, one guide block 21c may be disposed on the rear surface of the flat plate 21 correspondingly to at least one elastic portion 21b.

Figure 15:
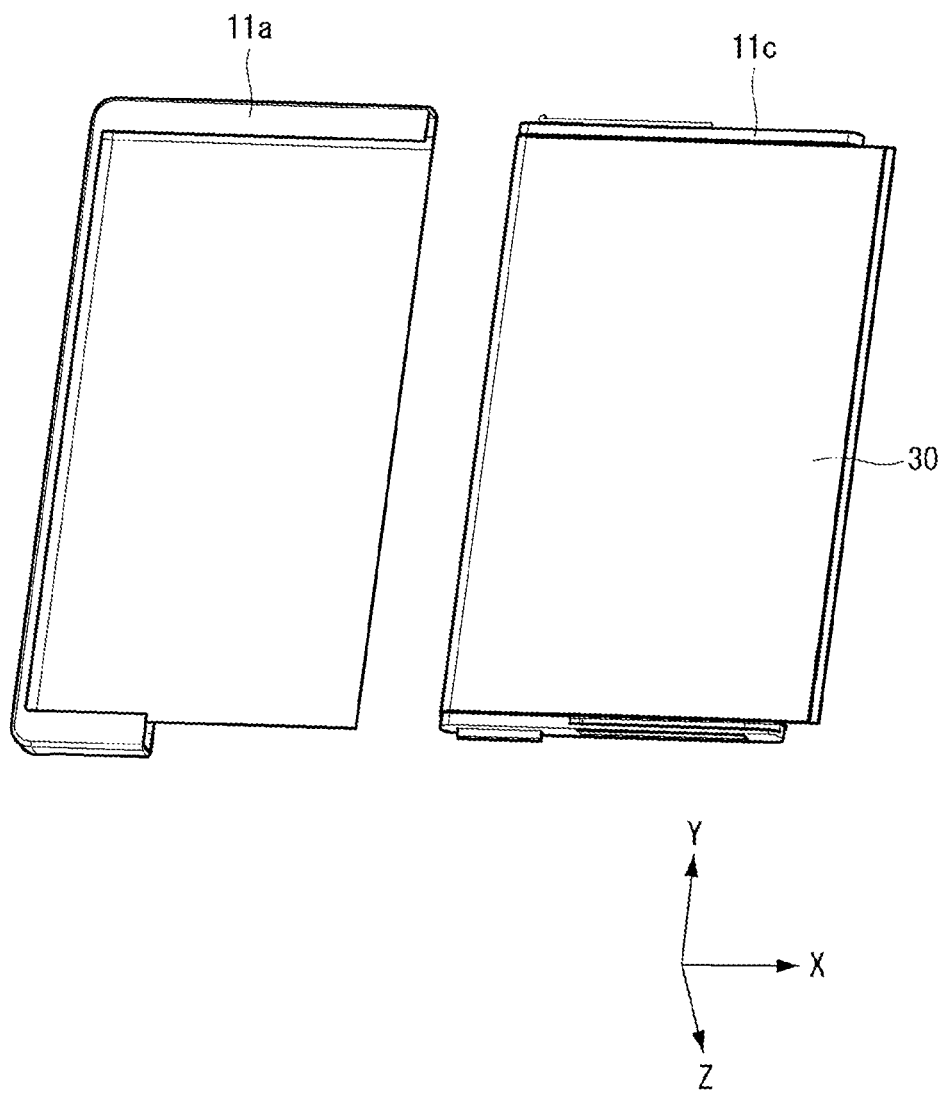
FIG. 15 illustrates an operation of coupling a main body to a first body in accordance with an embodiment of the invention.
Figure 16:
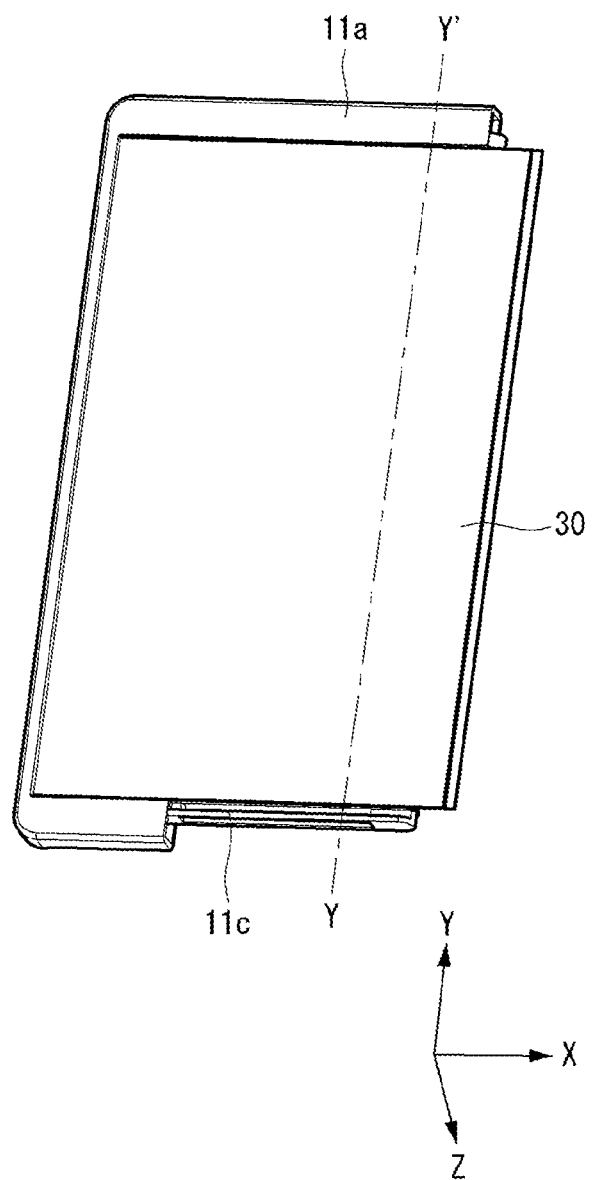
FIG. 16 illustrates a state in which a main body is coupled to a first body in accordance with an embodiment of the invention.
Figure 17:
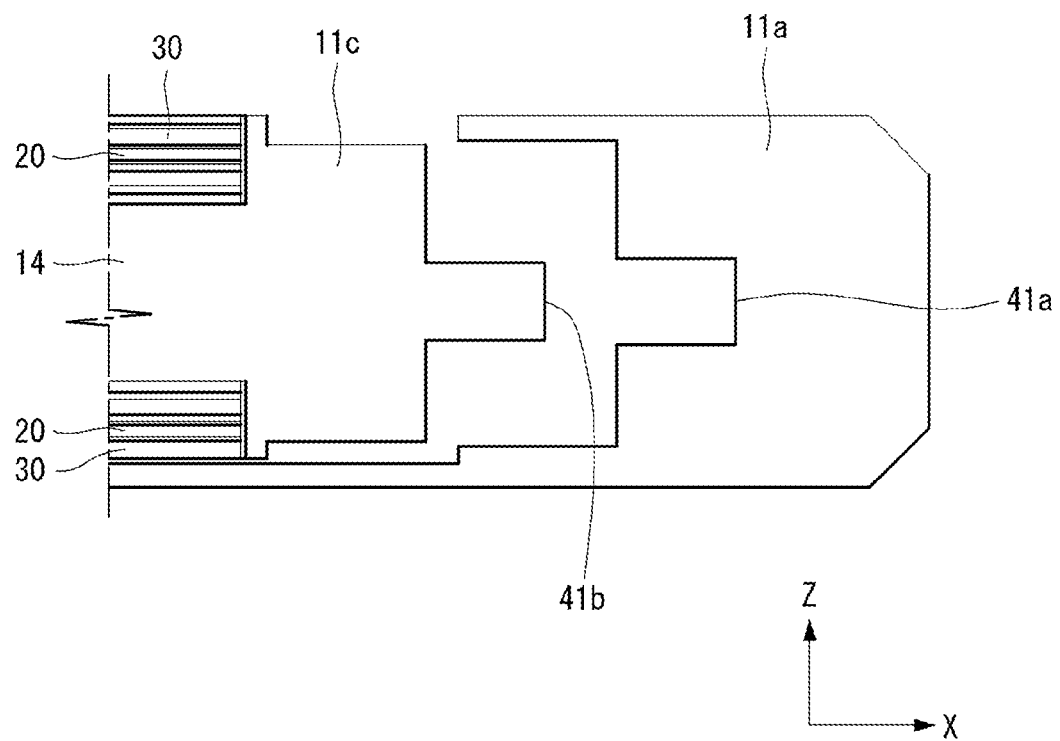
FIG. 17 illustrates a side guide and a side lip according to an embodiment of the invention.
Figure 18:
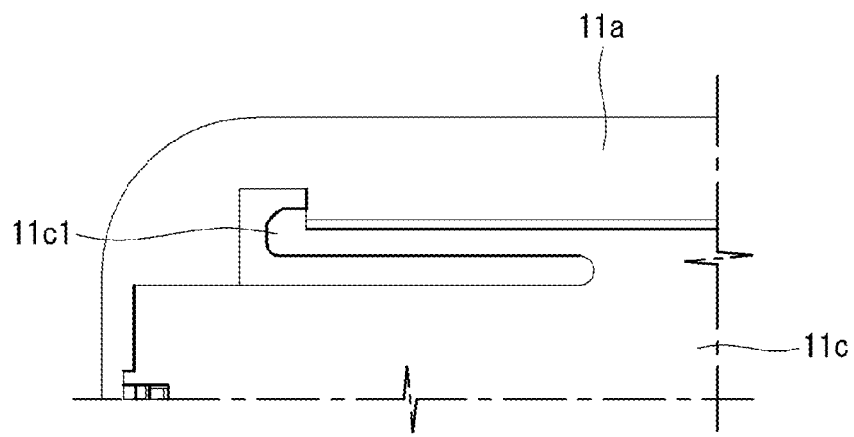
FIG. 18 illustrates a hook according to an embodiment of the invention.
Figure 18:
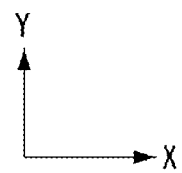

FIG. 15 illustrates an operation of coupling a frame to a first body in accordance with the embodiment of the invention. FIG. 16 illustrates a state in which a frame is coupled to a first body in accordance with the embodiment of the invention. FIG. 17 illustrates a side guide and a side rib according to the embodiment of the invention. FIG. 18 illustrates a hook according to the embodiment of the invention.

Referring to FIGS. 15 to 18, the frame 11c may mount the flexible display 30 and may be coupled to the first body 11a in a sliding manner As shown in FIG. 17, a side guide 41a for guiding the frame 11c, on which a plurality of electronic components are mounted, may be disposed in an inner space of the first body 11a.

The side guide 41a may be disposed on an inner upper side or an inner lower side of the first body 11a in a concave shape in a direction from the inner space of the first body 11a to the outside and may be extended elongatedly. The side guide 41a may guide the frame 11c to be mounted at a correct position while the frame 11c is coupled to the first body 11a.

The frame 11c may include a side rib 41b, that has a protruding side and is accommodated in the side guide 41a, and a hook 11c1 for fixing the frame 11c coupled to the first body 11a.

The side rib 41b of the frame 11c may be disposed to protrude at a location corresponding to the side guide 41a. Although not shown, a guide ball may be further disposed at an end of the side rib 41b. The guide ball may rotate so that the side rib 41b inserted into the side guide 41a more smoothly slides.

As described above, as the side rib 41b of the frame 11c is inserted into the side guide 41a of the first body 11a and slidingly operates, the frame 11c can be accurately assembled in the inner space of the first body 11a. Furthermore, as a predetermined gap is secured between the side guide 41a and the side rib 41b, an impact transferred from the outside can be reduced. Namely, because an air layer is formed in the gap secured between the side guide 41a and the side rib 41b, the impact transferred from the outside can be reduced.

As shown in FIG. 18, when the frame 11c is accurately assembled in the inner space of the first body 11a using the side guide 41a and the side rib 41b, the hook 11c1 disposed at the end of the frame 11c may be coupled to the first body 11a. When the hook 11c1 of the frame 11c is coupled to the first body 11a, the frame 11c can be firmly fixed to the first body 11a.

Figure 19:
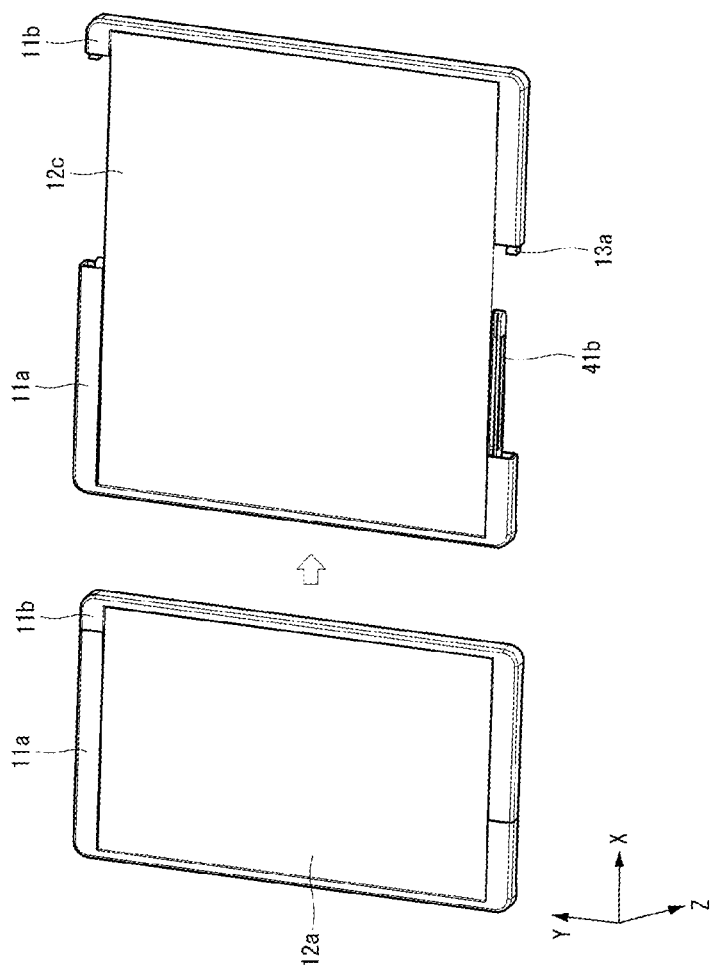
FIG. 19 illustrates an operation of changing a mobile terminal from a first state to a second state in accordance with an embodiment of the invention.
Figure 20:
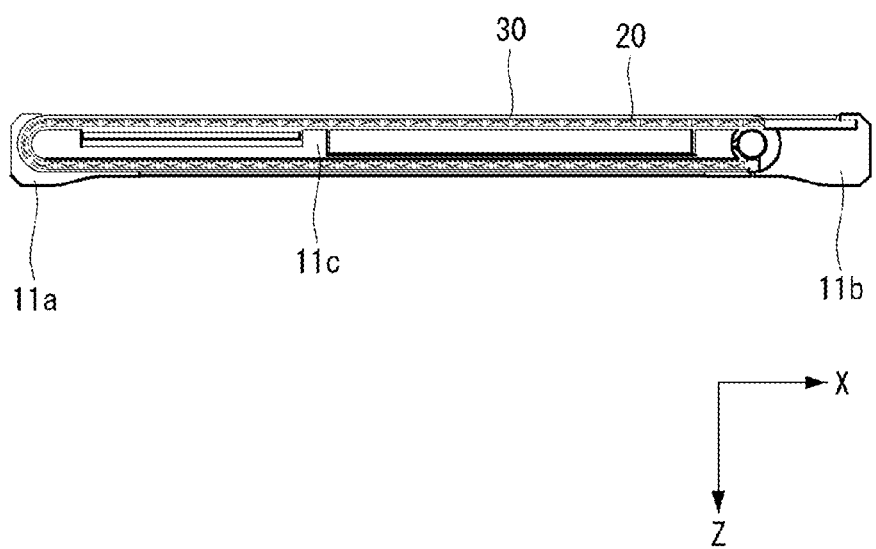
FIG. 20 illustrates a mobile terminal of a first state according to an embodiment of the invention when viewed from an upper side.
Figure 21:
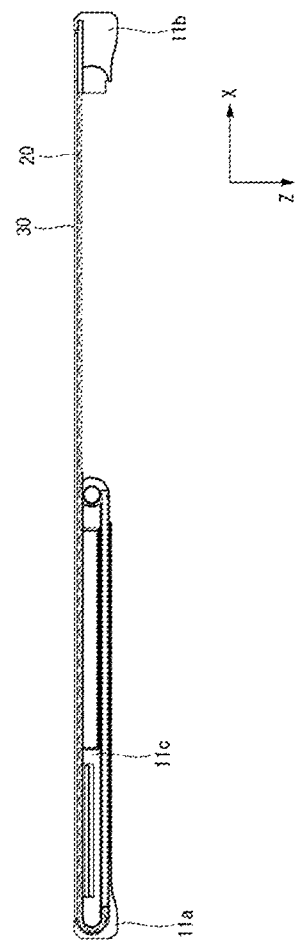
FIG. 21 illustrates a mobile terminal of a second state according to an embodiment of the invention when viewed from an upper side.

FIG. 19 illustrates an operation of changing the mobile terminal from a first state to a second state in accordance with the embodiment of the invention. FIG. 20 illustrates the mobile terminal of a first state according to the embodiment of the invention when viewed from an upper side. FIG. 21 illustrates the mobile terminal of a second state according to the embodiment of the invention when viewed from an upper side.

Referring to FIGS. 19 to 21, the mobile terminal 10 may be changed from a first state to a second state using a force of the user. On the contrary, the mobile terminal 10 may be changed from the second state to the first state through an operation of the display pole 22 disposed in the inner space of the first body 11a.

In order that the mobile terminal 10 transits from the second state to the first state, the force of the user is not necessary. However, in order that the mobile terminal 10 transits from the first state to the second state, the force of the user is required. In this instance, when the first body 11a or the second body 11b of the mobile terminal 10 is formed to be thin and flat, it may be very difficult for the user to transfer his/her force to the first body 11a or the second body 11b, and also his/her hand may slide easily when the force of the user is applied. In order to prevent this, the side of each of the first body 11a and the second body 11b of the mobile terminal 10 may be rounded. Namely, the side of each of the first body 11a and the second body 11b may be formed in a round shape or a concave shape suitable for a hand grip of the user.

When the user changes the mobile terminal 10 from the first state to the second state, he/she may hold the side of the first body 11a and the side of the second body 11b and pull them to both sides. In this instance, the sides of the first and second bodies 11a and 11b of the mobile terminal 10 may be rounded so that the user more conveniently changes the mobile terminal 10 from the first state to the second state.

As described above, as the sides of the first and second bodies 11a and 11b of the mobile terminal 10 are rounded, the user can change the mobile terminal 10 from the first state to the second state more naturally and stably.

Figure 22:
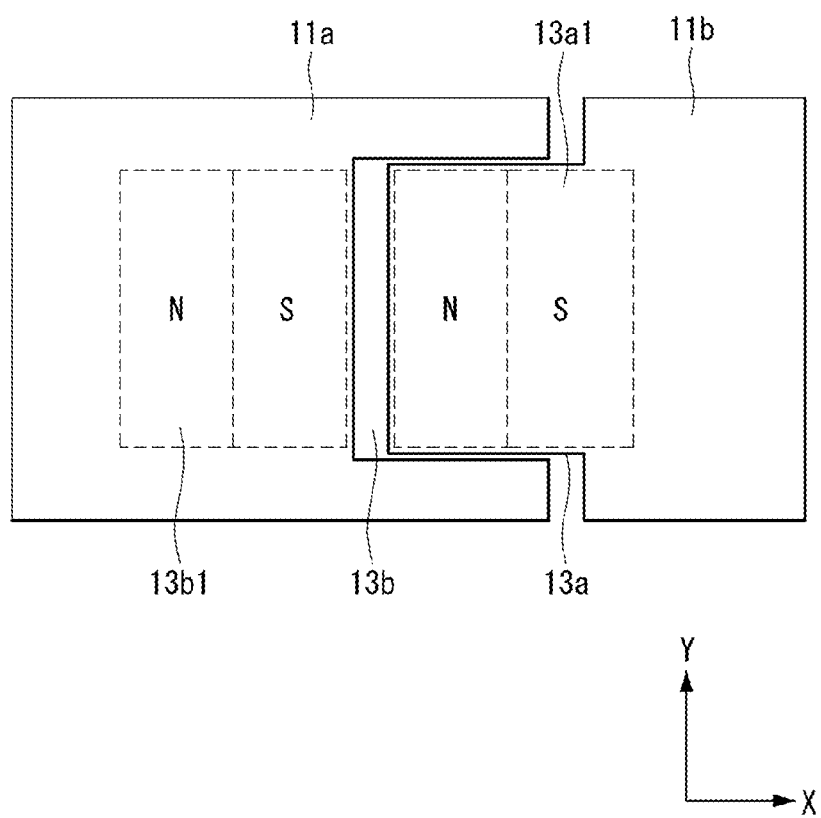
FIG. 22 is an enlarged view of a coupling protrusion of a second body according to an embodiment of the invention.

FIG. 22 is an enlarged view of a coupling protrusion of the second body according to the embodiment of the invention.

Referring to FIG. 22, the first body 11a and the second body 11b may be coupled to each other when the mobile terminal 10 is changed from the second state to the first state. In this instance, the first body 11a and the second body 11b may respectively have a coupling groove 13b and a coupling protrusion 13a, so as to increase a coupling strength between the first body 11a and the second body 11b.

The second body 11b may include at least one coupling protrusion 13a in a coupling portion coupled to the first body 11a. For example, the coupling protrusions 13a may be respectively disposed at the upper side and the lower side of the second body 11b. The first body 11a may include the coupling groove 13b at a location corresponding to the coupling protrusion 13a of the second body 11b.

The coupling protrusion 13a inserted into the coupling groove 13b can prevent the first body 11a and the second body 11b from being arbitrarily separated from each other until the user separates the first body 11a and the second body 11b using his/her force.

Each of the coupling protrusion 13a and the coupling groove 13b may include a magnetic material. As described above, because the coupling protrusion 13a and the coupling groove 13b each include the magnetic material, a coupling position of the first and second bodies 11a and 11b can be corrected when the first body 11a and the second body 11b are coupled. Hence, the first body 11a and the second body 11b can be precisely coupled. The magnetic materials may be magnets 13a1 and 13b1.

FIG. 22 illustrates that the first body 11a and the second body 11b respectively include the coupling groove 13b and the coupling protrusion 13a, by way of example. However, embodiments of the invention are not limited thereto. For example, the first body 11a may include the coupling protrusion 13a, and the second body 11b may include the coupling groove 13b.

Further, when the first body 11a and the second body 11b include the metal material, only one of the coupling groove 13b and the coupling protrusion 13a may include the magnet.

Figure 23:
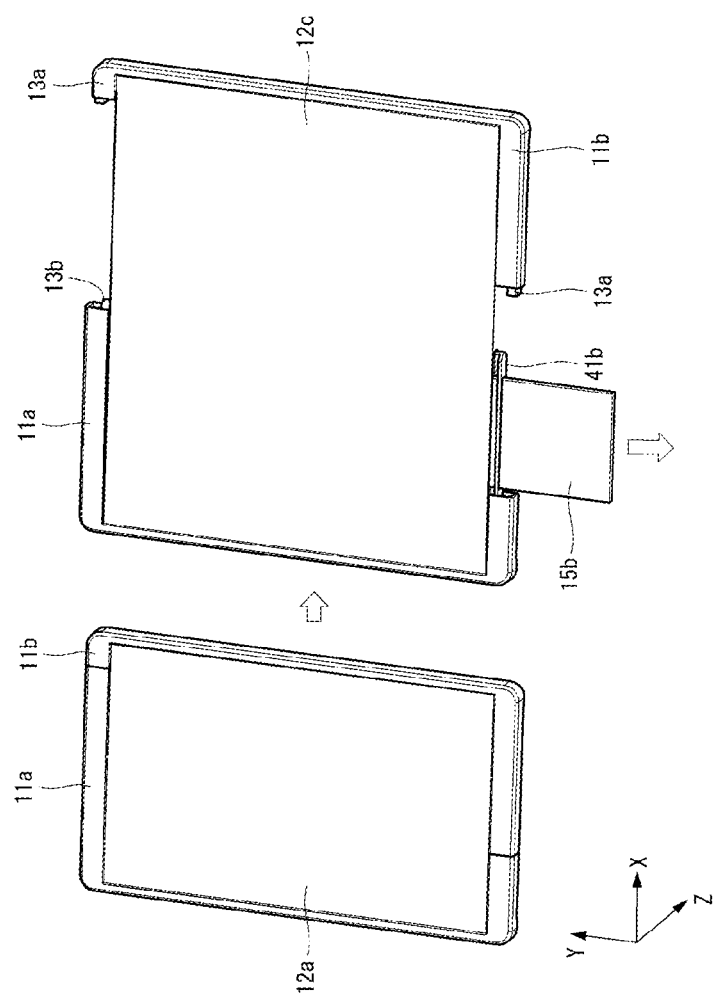
FIG. 23 illustrates an operation of detaching a battery in accordance with an embodiment of the invention.

FIG. 23 illustrates an operation of detaching the battery in accordance with the embodiment of the invention.

Referring to FIG. 23, the battery detachable portion 15 may be configured such that a replaceable battery 15b is applied.

The battery detachable portion 15 may be disposed in the inner space of the first body 11a. The user can change the mobile terminal 10 from the first state to the second state, in order to attach or detach the battery 15b to or from the battery detachable portion 15.

After the user maintains the second state of the mobile terminal 10, the user may click on a battery switch 15a and detach the replaceable battery 15b inserted into the battery detachable portion 15. The battery detachable portion 15 may pass through the side rib 41b disposed on the lower side of the frame 11c, and thus the replaceable battery 15b may be detached. Such a replacement method may be substantially the same as a replacement method of a general compact digital camera battery.

Figure 24:
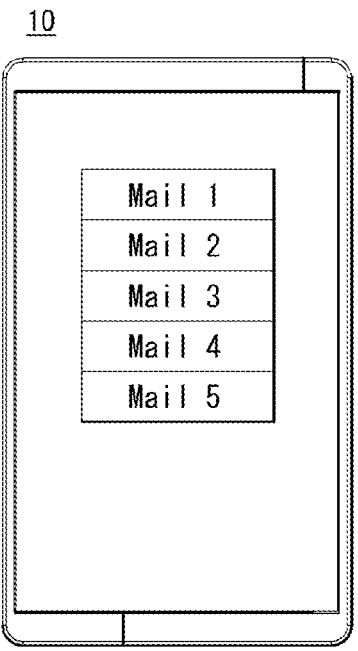
FIG. 24 illustrates an operation of a mobile terminal according to an embodiment of the invention.
Figure 24:
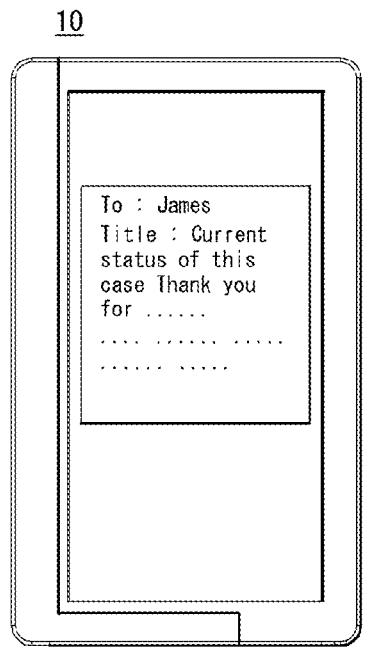
Figure 24:
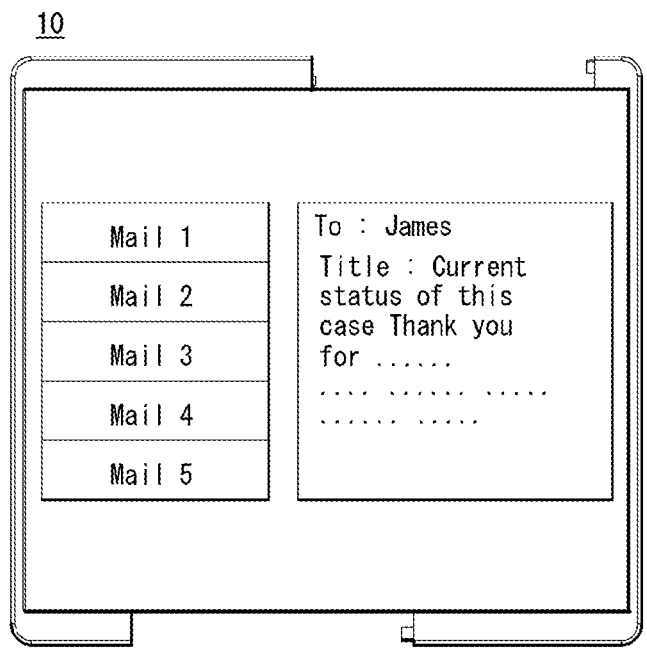

FIG. 24 illustrates an operation of the mobile terminal according to the embodiment of the invention.

In FIG. 24, (a) illustrates that a first screen is displayed in a first state of the mobile terminal 10, (b) illustrates that a second screen is displayed in the first state of the mobile terminal 10, and (c) illustrates that a third screen is displayed in a second state of the mobile terminal 10.

The first state may indicate a close scene before the screen of the mobile terminal 10 is extended, and the second state may indicate an open scene after the screen of the mobile terminal 10 is extended.

When the mobile terminal 10 is changed from the first state to the second state, a screen mode may be automatically changed depending on a selection of the user. For example, when the mobile terminal 10 is changed from the first state to the second state, the screen mode may be automatically changed from a portrait mode to a landscape mode.

When the mobile terminal 10 is changed from the first state to the second state, the screen size may increase from the first screen to the third screen. Thus, an aspect ratio of the first screen may be different from an aspect ratio of the third screen. Namely, as the screen size increases from the first screen to the third screen, an aspect ratio suitable for the first screen may be automatically reset to an aspect ratio suitable for the third screen.

As shown in (a) of FIG. 24, the user may check the email on the first screen in the first state of the mobile terminal 10. When the user selects one of emails displayed on the first screen, contents of the selected email may be displayed on the first screen.

As shown in (b) of FIG. 24, when the user selects one of emails displayed on the first screen, contents of the selected email may be displayed on the second screen disposed on the rear surface of the mobile terminal 10.

As shown in (c) of FIG. 24, the user may select one of emails displayed on the first screen and change the mobile terminal 10 from the first state to the second state. When the user changes the mobile terminal 10 from the first state to the second state while selecting one of emails displayed on the first screen as described above, the screen of the mobile terminal 10 may be automatically divided. An email list may be displayed on one screen, and contents of email selected from the email list may be displayed on another screen.

Figure 25:
FIG. 25 illustrates an operation of a mobile terminal according to another embodiment of the invention.
Figure 25:
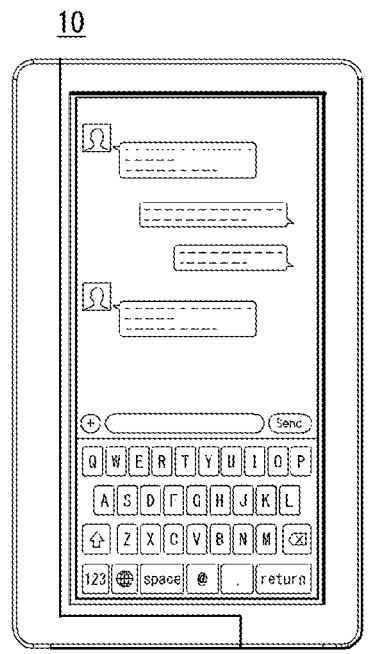
Figure 25:
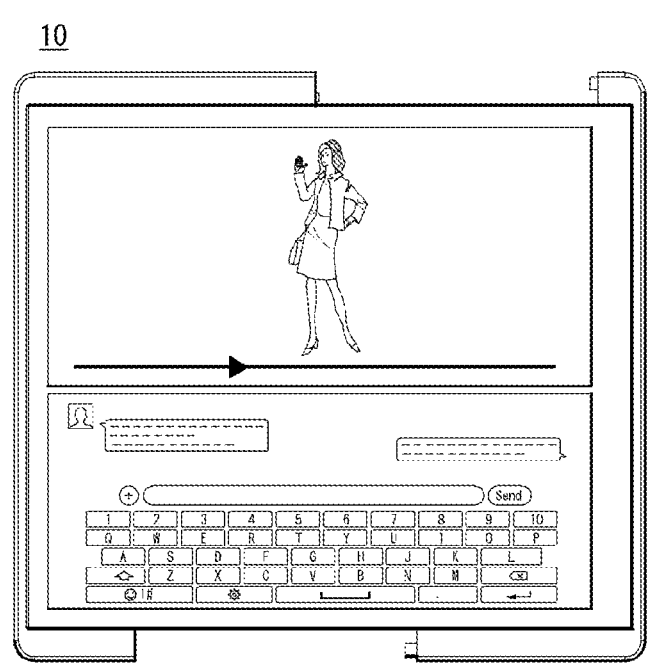

FIG. 25 illustrates an operation of a mobile terminal according to another embodiment of the invention.

In FIG. 25, (a) illustrates that a first screen is displayed in a first state of the mobile terminal 10, (b) illustrates that a second screen is displayed in the first state of the mobile terminal 10, and (c) illustrates that a third screen is displayed in a second state of the mobile terminal 10.

As shown in (a) of FIG. 25, the user may watch a video on the first screen in the first state of the mobile terminal 10. A message of SNS or email may be received while the user is watching the video on the first screen. The user has to switch the display screen of the video to another screen in order to check the received email or SNS message.

As shown in (b) of FIG. 25, when a message of SNS or email is received while the user is watching a video on the first screen, the user may easily check the received email or SNS message on the second screen disposed on the rear surface of the mobile terminal 10 while displaying the video on the first screen.

As shown in (c) of FIG. 25, when a message of SNS or email is received while the user is watching a video on the first screen, the user may change the mobile terminal 10 from the first state to the second state. When the user changes the mobile terminal 10 from the first state to the second state while displaying the video on the first screen as described above, the screen of the mobile terminal 10 may be automatically divided. The video may be continuously displayed on one screen, and contents of the email or the SNS message may be displayed on another screen.

The user may chat with the other party on another screen while watching the video on the one screen. Furthermore, the user may share the video he/she is watching with the other party in real time and watch it together while chatting in real time.

When an incoming call is received in a situation where the user is watching the video in the second state of the mobile terminal 10 as shown in (c) of FIG. 25, the user may automatically receive the call while the mobile terminal 10 is changed from the second state to the first state.

As described above with reference to FIGS. 24 and 25, as the screen size of the mobile terminal 10 according to the embodiment of the invention increases due to the transition of the mobile terminal 10 from the first state to the second state, the display screen of the mobile terminal 10 can be divided into one or more screens. Hence, the user can easily perform multitasking.

Figure 26:
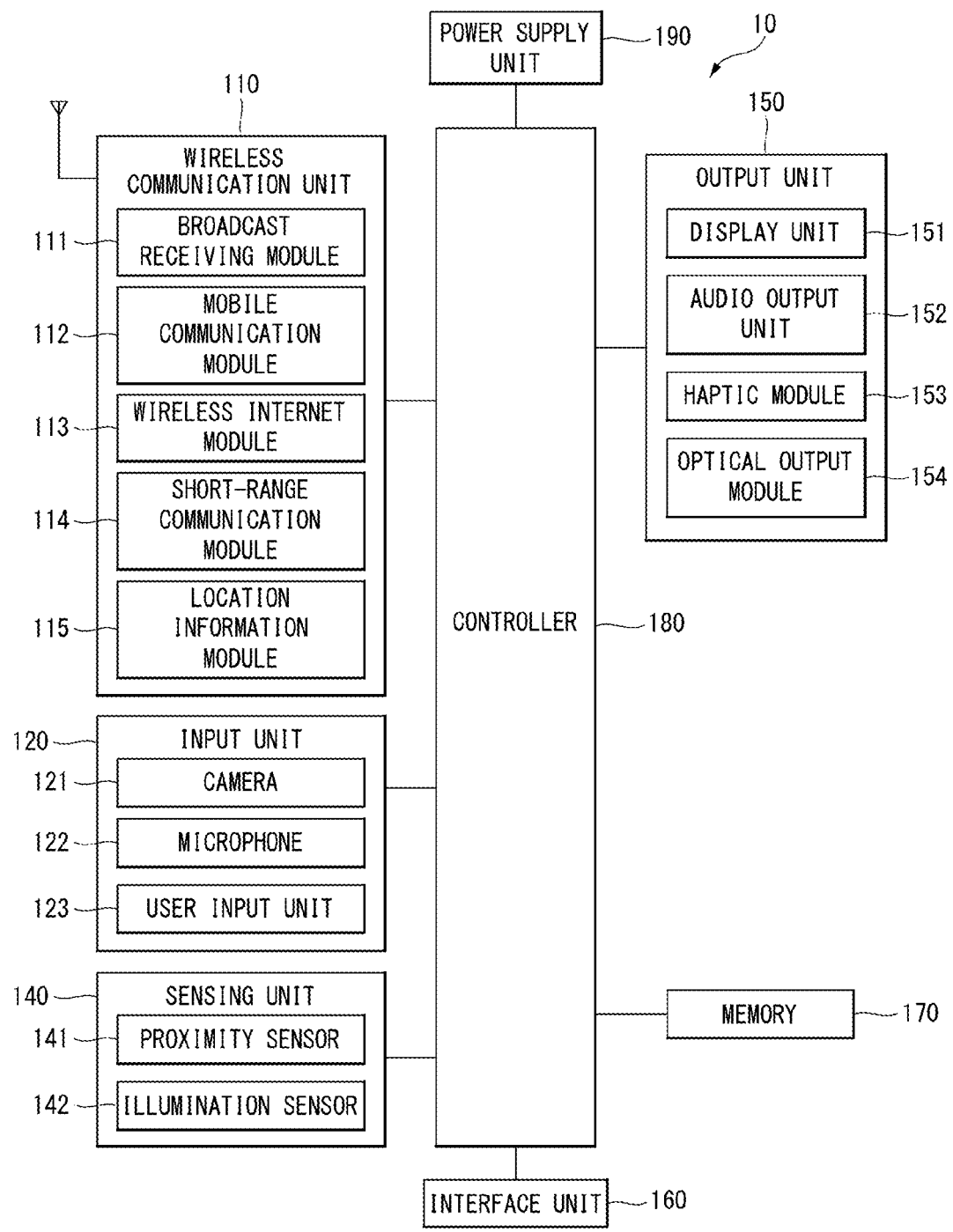
FIG. 26 is a block diagram of a mobile terminal related to an embodiment of the invention.

FIG. 26 is a block diagram of a mobile terminal related to the embodiment of the invention.

Referring to FIG. 26, the mobile terminal 10 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that more or fewer components may alternatively be implemented.

As shown in FIG. 26, the mobile terminal 10 is shown having the wireless communication unit 110 configured with several commonly implemented components. For instance, the wireless communication unit 110 typically includes one or more components which permit wireless communication between the mobile terminal 10 and a wireless communication system or network within which the mobile terminal is located.

The wireless communication unit 110 typically includes one or more modules which permit communications such as wireless communications between the mobile terminal 10 and a wireless communication system, communications between the mobile terminal 10 and another mobile terminal, communications between the mobile terminal 10 and an external server. Further, the wireless communication unit 110 typically includes one or more modules which connect the mobile terminal 10 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 26, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a fingerprint scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The mobile terminal 10 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and an optical output module 154.

The display unit 151 may have an inter-layered structure or an integrated structure with a touch sensor in order to facilitate a touch screen. The touch screen may provide an output interface between the mobile terminal 10 and a user, as well as function as the user input unit 123 which provides an input interface between the mobile terminal 10 and the user.

The interface unit 160 serves as an interface with various types of external devices that can be coupled to the mobile terminal 10. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 10 may perform assorted control functions associated with a connected external device, in response to the external device being connected to the interface unit 160.

The memory 170 is typically implemented to store data to support various functions or features of the mobile terminal 10. For instance, the memory 170 may be configured to store application programs executed in the mobile terminal 10, data or instructions for operations of the mobile terminal 10, and the like. Some of these application programs may be downloaded from an external server via wireless communication. Other application programs may be installed within the mobile terminal 10 at time of manufacturing or shipping, which is typically the case for basic functions of the mobile terminal 10 (for example, receiving a call, placing a call, receiving a message, sending a message, and the like). It is common for application programs to be stored in the memory 170, installed in the mobile terminal 10, and executed by the controller 180 to perform an operation (or function) for the mobile terminal 10.

The controller 180 typically functions to control overall operation of the mobile terminal 10, in addition to the operations associated with the application programs. The controller 180 may provide or process information or functions appropriate for a user by processing signals, data, information and the like, which are input or output by the various components depicted in FIG. 26, or activating application programs stored in the memory 170. As one example, the controller 180 controls some or all of the components illustrated in FIG. 26 according to the execution of an application program that have been stored in the memory 170.

The power supply unit 190 can be configured to receive external power or provide internal power in order to supply appropriate power required for operating elements and components included in the mobile terminal 10. The power supply unit 190 may include a battery, and the battery may be configured to be embedded in the device body, or configured to be detachable from the device body. The battery may receive electric power via a power cable connected to the interface unit 160. Also, the battery can be recharged in a wireless manner using a wireless charger. The wireless charging may be implemented by magnetic induction or electromagnetic resonance.

At least some of the above components may be combined with one another and operate, in order to implement an operation, a control, or a control method of a mobile terminal according to various embodiments described below. Further, an operation, a control, or a control method of a mobile terminal according to various embodiments may be implemented by an execution of at least one application program stored in the memory 170.

Embodiments may be embodied in many different forms and should not be construed as being limited to embodiments set forth herein; rather, embodiments may be provided so that this disclosure will be thorough and complete, and will fully convey the concept to those skilled in the art.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a body, including a first body and a second body fastened to the first body in a first state, the second body separated from the first body to be in a second state;
   a flexible display including:
   a first flexible display connected to the second body and configured to display an image, the first flexible display located on a front surface of the body; and
   a second flexible display connected to the first flexible display and located on at least one of a rear surface of the body or a lateral surface of the body; and
   a guide sheet comprising:
   a flat plate positioned at a rear surface of the flexible display; and
   an elastic portion located at a rear side of the flat plate and providing the flexible display with an elastic force,
   wherein at least a portion of the second flexible display is located on the front surface of the body when the second body is separated from the first body, and
   wherein information is displayed on the at least a portion of the second flexible display in both the first and second states of the mobile terminal.

2. The mobile terminal of claim 1, wherein the guide sheet further includes:
   a plurality of guide blocks protruding from a rear surface of the flat plate in a rearward direction and disposed to be spaced apart from one another by a predetermined distance;
   a fixing pin passing through a central portion of the elastic portion and fastened to the rear surface of the flat plate; and
   a fixing film laid on an end of the guide block.

3. The mobile terminal of claim 2, wherein the guide block is coupled to the fixing film.

4. The mobile terminal of claim 2, wherein the plurality of guide blocks is disposed in a longitudinal direction or a width direction of the flexible display.

5. The mobile terminal of claim 1, wherein the elastic portion has an arch plate shape.

6. The mobile terminal of claim 1, further comprising a side guide disposed in an inner space of the first body and guiding a frame on which a plurality of electronic components is mounted, wherein the frame includes a side rib that has a protruding side and is accommodated in the side guide, and a hook fixing the frame coupled to the first body.

7. The mobile terminal of claim 6, wherein the frame further includes a display pole that is fastened to an end of the guide sheet, wherein the guide sheet is connected to one of the frame and the body, wherein the guide sheet is connected to the guide sheet, wherein the guide sheet provides the guide sheet with an elastic force which prohibits a separation of the second body from the first body.

8. The mobile terminal of claim 7, wherein the display pole includes:
a pole connected to the frame;
a wire roller having an hollow portion into which the pole is inserted;
a spring, wherein an end of the spring is connected to one of the frame or the body or the pole, wherein an another end of the spring is connected to the wire roller; and
a wire, winding on the wire roller, wherein an end of the wire is connected to the wire roller, wherein an another end of the wire is connected to the guide sheet.

9. The mobile terminal of claim 8, further comprising:
a wire fixing portion disposed at one end of the flat plate and fastened to the wire; and
a fixing protrusion disposed at the other end of the flat plate and fastened to the second body.

10. The mobile terminal of claim 1, wherein a coupling protrusion of a protruding shape and a coupling groove, into which the coupling protrusion is inserted, are respectively formed at contact sides of the first body and the second body.

11. The mobile terminal of claim 10, wherein at least one of the coupling protrusion and the coupling groove includes a magnetic material.

12. The mobile terminal of claim 1, wherein at least a portion of the flexible display includes a display surface in a side direction of the mobile terminal when the second body is fastened to the first body.

13. The mobile terminal of claim 1, further comprising a controller configured to change the flexible display from one of a landscape mode and a portrait mode to the other depending on a separation of the first and second bodies.

14. The mobile terminal of claim 1, further comprising a controller configured to change an aspect ratio of an image displayed on the flexible display depending on a separation of the first and second bodies.

15. The mobile terminal of claim 1, wherein the flexible display stays in one of states including a first state and a second state, wherein a portion of the flexible display is accommodated in the first body in the first state, wherein the portion of the flexible display is located outside the first body when the second body is separated from the first body.

16. A mobile terminal comprising:
a body including a first body and a second body separable from the first body;
a flexible display configured to be in one of states including a first state, in which a portion of the flexible display is accommodated in the first body, and a second state, in which the portion of the flexible display is extended to outside of the first body when the first and second bodies are separated; and
a guide sheet supporting the flexible display at a rear surface of the flexible display,
wherein a display surface of the flexible display is positioned in a forward direction and a rearward direction of the body in the first state, and the display surface of the flexible display is positioned only in the forward direction of the body in the second state, the display surface displaying an image in both the first and second states, and
wherein the guide sheet includes a flat plate contacting the rear surface of the flexible display and an elastic portion providing an elastic force in the forward direction of the body at a rear surface of the flat plate.

17. The mobile terminal of claim 16, wherein at least a portion of the flexible display further includes a display surface in a side direction of the mobile terminal in at least one of the first state and the second state.

18. The mobile terminal of claim 16, further comprising a controller configured to change the flexible display from one of a landscape mode and a portrait mode to the other depending on a state change of the flexible display.

19. The mobile terminal of claim 16, further comprising a controller configured to change an aspect ratio of an image displayed on the flexible display depending on a state change of the flexible display.

* * * * *